(12) United States Patent
Chhabra et al.

(10) Patent No.: US 10,325,118 B2
(45) Date of Patent: Jun. 18, 2019

(54) CRYPTOGRAPHIC CACHE LINES FOR A TRUSTED EXECUTION ENVIRONMENT

(71) Applicant: Intel Corporation, Santa Clara, CA (US)

(72) Inventors: Siddhartha Chhabra, Portland, OR (US); Francis X. Mckeen, Portland, OR (US); Carlos V. Rozas, Portland, OR (US); Saeedeh Komijani, Mountain View, CA (US); Tamara S. Lehman, Durham, NC (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/861,924

(22) Filed: Jan. 4, 2018

(65) Prior Publication Data

US 2018/0204025 A1    Jul. 19, 2018

Related U.S. Application Data

(63) Continuation of application No. 14/863,353, filed on Sep. 23, 2015, now Pat. No. 9,904,805.

(51) Int. Cl.
*G06F 21/72* (2013.01)
*G06F 21/78* (2013.01)
(Continued)

(52) U.S. Cl.
CPC .......... *G06F 21/72* (2013.01); *G06F 12/1408* (2013.01); *G06F 21/64* (2013.01);
(Continued)

(58) Field of Classification Search
CPC ............ H04L 9/002; G06F 21/72; G06F 21/64
See application file for complete search history.

(56) References Cited

U.S. PATENT DOCUMENTS

| 8,782,434 B1 * | 7/2014 | Ghose ................... G06F 9/3851 713/190 |
| 2008/0117679 A1 | 5/2008 | Srinivasan et al. |

(Continued)

OTHER PUBLICATIONS

International Search Report and Written Opinion of International Patent Application No. PCT/US2016/045408, 14 pages, dated Nov. 2, 2016.

*Primary Examiner* — Jason K Gee
*Assistant Examiner* — Abdullah Almamun
(74) *Attorney, Agent, or Firm* — Lowenstein Sandler LLP

(57) ABSTRACT

Memory security technologies are described. An example processing system includes a processor core and a memory controller coupled to the processor core and a memory. The processor core can receive a content read instruction from an application. The processor core can identify a cache line (CL) from a plurality of CLs of a cryptographic cache block (CCB) requested in the content read instruction. The processor core can load, from a cryptographic tree, tree nodes with security metadata. The processor core can retrieve, from the memory, the CCB. The processor core can generate a second MAC from the CCB. The processor core can compare the first MAC with the second MAC. The processor core can decrypt the CCB using security metadata when the first MAC matches the second MAC. The processor core can send at least the identified CL from the decrypted CCB to the application.

18 Claims, 21 Drawing Sheets

(51) Int. Cl.
*H04L 9/00* (2006.01)
*G06F 21/64* (2013.01)
*G06F 12/14* (2006.01)
*H04L 9/06* (2006.01)
*H04L 9/32* (2006.01)

(52) U.S. Cl.
CPC .............. *G06F 21/78* (2013.01); *H04L 9/002* (2013.01); *H04L 9/0637* (2013.01); *H04L 9/3242* (2013.01); *H04L 2209/12* (2013.01)

(56) References Cited

U.S. PATENT DOCUMENTS

| | | |
|---|---|---|
| 2012/0079283 A1 | 3/2012 | Hashimoto et al. |
| 2014/0040632 A1 | 2/2014 | Chhabra et al. |
| 2014/0101461 A1 | 4/2014 | Chhabra et al. |
| 2014/0223197 A1 | 8/2014 | Gueron et al. |
| 2015/0186295 A1* | 7/2015 | Savagaonkar ...... G06F 12/1408 713/193 |
| 2015/0301957 A1* | 10/2015 | Elias ...................... G06F 21/79 726/26 |
| 2015/0370728 A1* | 12/2015 | Yamada .............. G06F 12/1416 711/163 |

\* cited by examiner

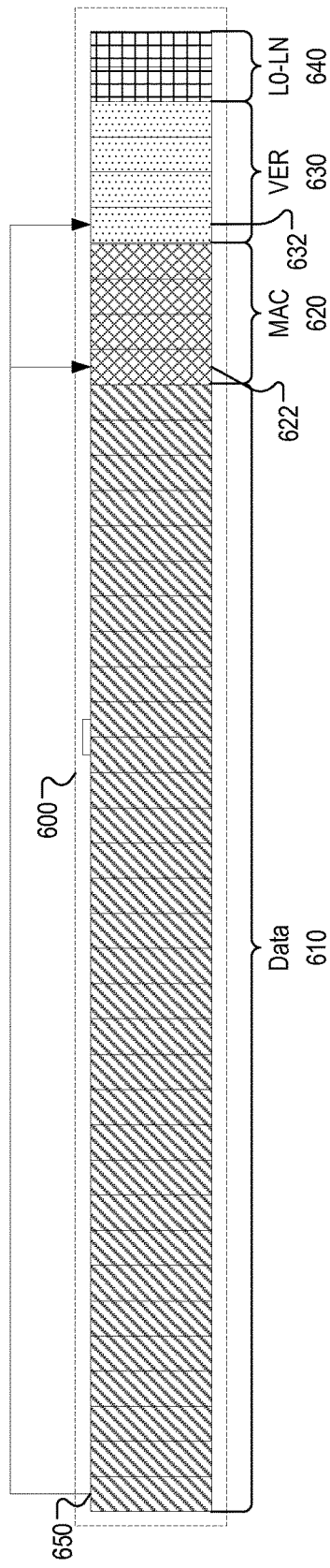
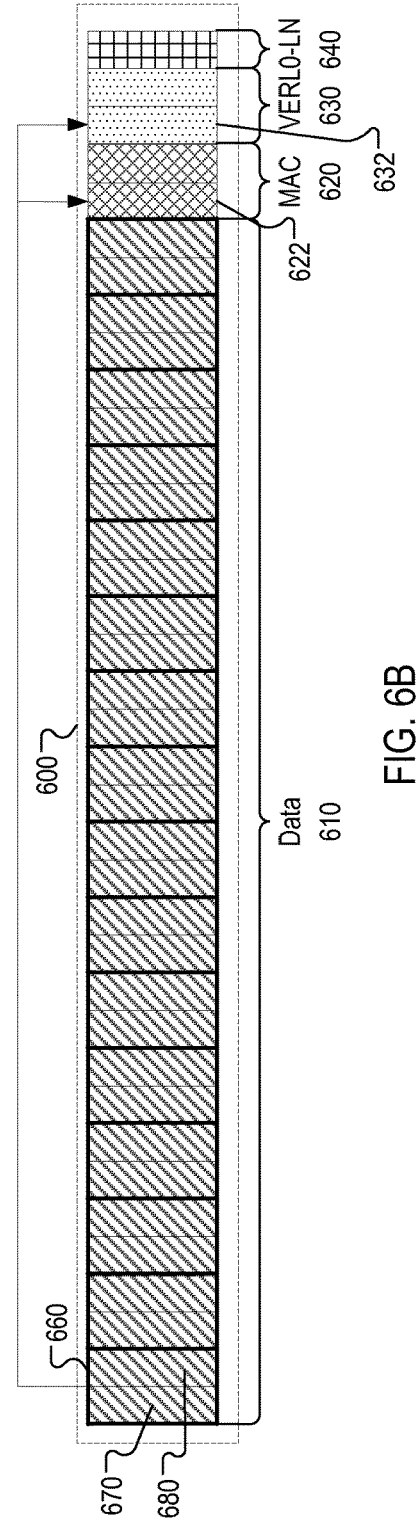
FIG. 6A
FIG. 6B

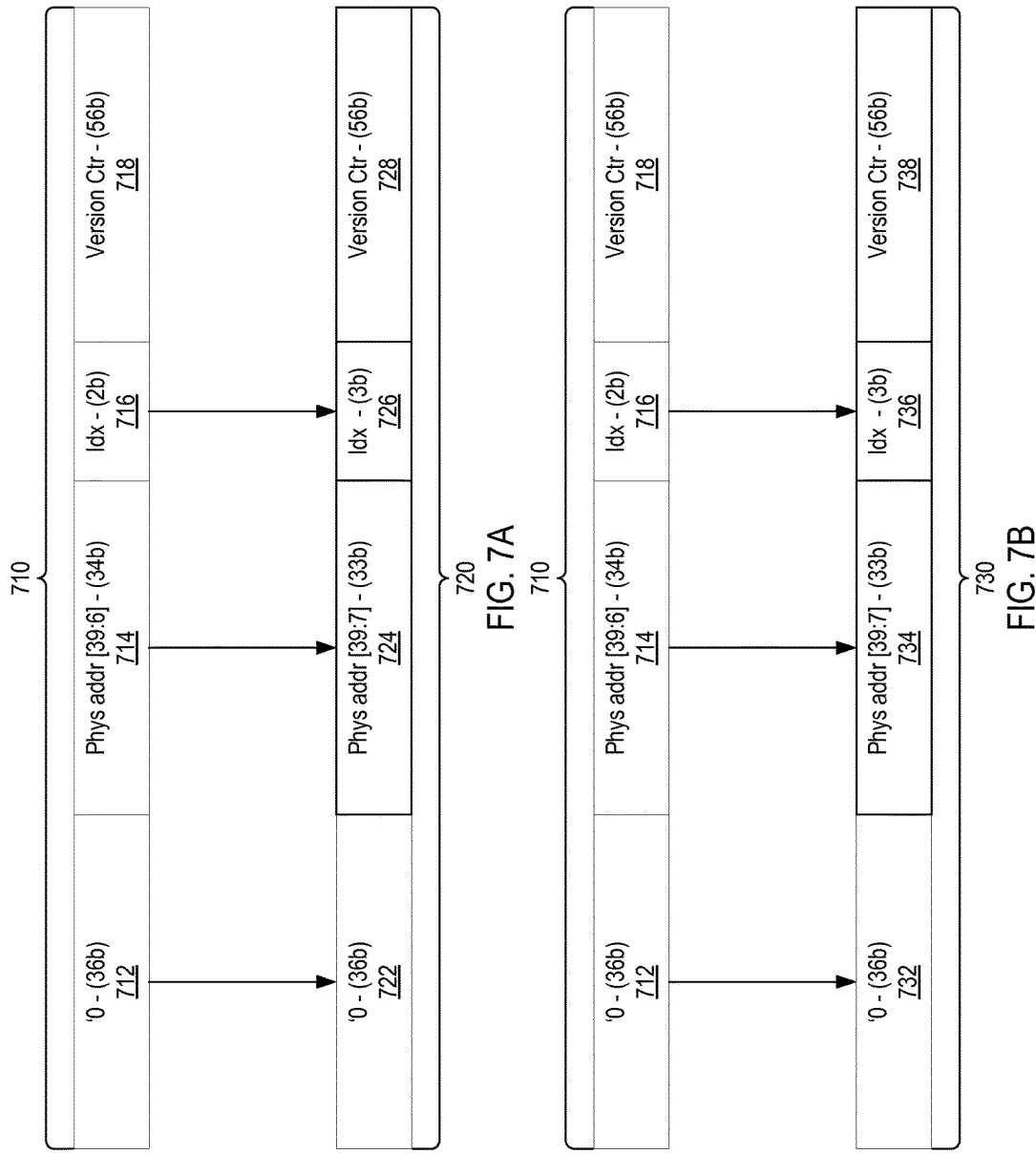

CRYPTOGRAPHIC CACHE LINES FOR A TRUSTED EXECUTION ENVIRONMENT

RELATED APPLICATIONS

This application is a continuation application of U.S. patent application Ser. No. 14/863,353, filed on Sep. 23, 2015, the entire contents of which are incorporated by reference.

BACKGROUND

Computer systems, such as hardware systems and software systems that run on computers often have undetected flaws that can be exploited by hardware attacks or software attacks, such as malicious computer programs that are received over the Internet or other communication networks. The hardware attacks and software attacks can include Trojans, viruses, worms, spyware, and other malware. Many existing computer security systems combat hardware attacks and software attacks by attempting to prevent the attacks from compromising any part of the computer system.

Processors in computer systems are designed to protect sensitive data in memory from both hardware attacks and software attacks. Some processors provide cryptographic mechanisms for encryption, integrity, and replay protection. Memory encryption protects the confidentiality of memory-resident data. Integrity protection prevents an attacker from causing any hidden modifications to the ciphertext (i.e., encrypted data, as opposed to plaintext that is unencrypted data) in memory. Replay protection eliminates any undetected temporal substitution of the ciphertext. In the absence of encryption, integrity, and replay protections, an attacker with physical access to the system can record snapshots of cache lines and replay the cache lines at a later point in time to modify the cache lines and attack the computer system.

BRIEF DESCRIPTION OF THE DRAWINGS

FIG. 6A illustrates a memory with each CL associated with a unique MAC and a unique VER according to one embodiment.

FIG. 6B illustrates the memory with each CCB associated with a unique MAC and a unique VER according to one embodiment.

FIG. 7A illustrates a seed for a CL and a seed for a CCB according to one embodiment.

FIG. 7B illustrates an alternative seed for a CCB according to one embodiment.

DESCRIPTION OF EMBODIMENTS

Electronic devices are becoming widely interconnected and are heavily relied upon to process and store sensitive information. The risk of unauthorized access to the electronic devices and the sensitive information has been amplified with an increased interconnectivity of electronic devices. Conventional security systems provide relatively low assurance protection of an entire computing system of an electronic device.

To prevent hardware attacks or software attacks from infiltrating selected applications, processors can provide protected regions for selected applications to run. Access to the protected regions from any software that does not reside in the protected regions is prevented. The protected regions provide relatively high security for the software in the protected regions.

In one example, the protected regions do not attempt to prevent the hardware attacks or the software attacks from compromising parts of a computing system outside the protected regions, but stop the hardware attacks or the software attacks from compromising parts of the computing system within the protected regions. Accordingly, if a software system process outside the protected regions becomes compromised, the compromised process may be prevented from compromising software system resources within the protected region. One advantage of the protected regions is to provide confidentiality and integrity for the selected programs to run even in the presence of privileged malware or other rogue software programs running at high privilege levels.

Figure 1:
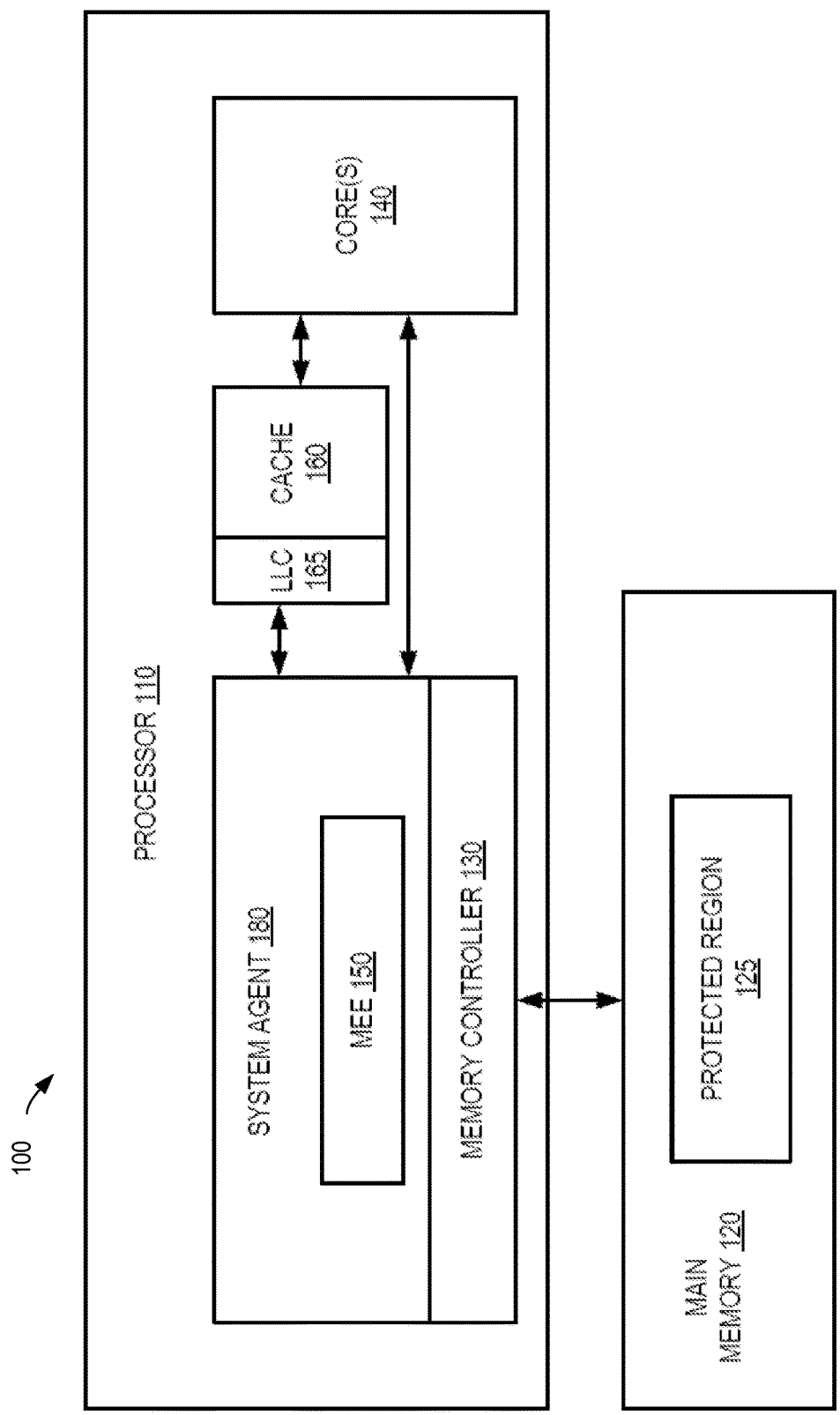
FIG. 1 is a block diagram illustrating a computing system that implements a memory encryption engine (MEE) to secure a main memory according to one embodiment.

FIG. 1 is a block diagram illustrating a computing system 100 that implements a memory encryption engine (MEE) 150 to secure a main memory 120 according to one embodiment. The main memory 120 may be setup at boot time by a basic input-output system (BIOS). The processor 110 executes instructions to add secured pages to a protected region of memory as guided by software executing on the processor 110. In one example, the software executing on the processor 110 is an operating system (OS). In another example, the software executing on the processor 110 is a virtual machine monitor (VMM), as described herein. Also, the memory protections afforded by the MEE are transparent to the computing system because the processor does not have to execute any instructions for providing confidentiality, integrity and replay protections. For example, when any cache line (CL) belonging to a secure page is evicted, the MEE automatically provides these protections to that CL. The processor 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processor 110 may be used in a system on a chip (SoC) system.

One embodiment may be described in the context of a single processor desktop or server system, but alternative embodiments may be included in a multiprocessor system. Computer system 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus that transmits data signals between the processor 110 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

Embodiments are not limited to computer systems. Alternative embodiments of the present invention can be used in other devices such as handheld devices and embedded applications. Some examples of handheld devices include cellular phones, Internet Protocol devices, digital cameras, PDAs, and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In one embodiment, the processor 110 includes a Level 1 (L1) internal cache memory 160. Depending on the architecture, the processor 110 may have a single internal cache or multiple levels of internal caches. Other embodiments include a combination of both internal and external caches. A register file is to store different types of data in registers including integer registers, floating-point registers, vector registers, banked registers, shadow registers, checkpoint registers, status registers, configuration registers, and instruction pointer register.

In one example, the execution unit has a floating-point unit. In another example, the execution unit does not have a floating-point unit. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110.

Alternate embodiments of an execution unit may also be used in micro controllers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 110. The processor 110 is coupled to the memory 120 via a processor bus. A system logic chip, such as a memory controller hub (MCH) may be coupled to the processor bus and memory 120. An MCH can provide a high bandwidth memory path to memory 120 for instruction and data storage and for storage of graphics commands, data and textures. For example, the MCH can be used to direct data signals between the processor 110, memory 120, and other components in the system 100 and to bridge the data signals between the processor bus, the memory 120, and the system I/O.

The MCH may be coupled to the memory 120 through a memory interface. In some embodiments, the system logic chip can provide a graphics port for coupling to a graphics controller through an Accelerated Graphics Port (AGP) interconnect. The system 100 may also include an I/O controller hub (ICH). The ICH can provide direct connections to some I/O devices via a local I/O bus. The local I/O bus is a high-speed I/O bus for connecting peripherals to the memory 120, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device can comprise a hard disk drive, a floppy disk drive, a CD-ROM device, a flash memory device, or other mass storage device.

In another embodiment, the instructions executed by the processor core 140 are used with a system on a chip. The system on a chip can comprise a processor and a memory. In one example, the memory for the system on a chip is a flash memory. The flash memory can be located on the same die as the processor and other system components. Additionally, other logic blocks such as a memory controller or graphics controller can also be located on the system on a chip.

The processor 110 includes one or more processor cores 140 to execute instructions of the system. The processor core 140 includes, but is not limited to, pre-fetch logic to fetch instructions, decode logic to decode the instructions, execution logic to execute instructions and the like. The processor 110 includes a cache 160 to cache instructions and/or data. The cache 160 includes, but is not limited to, level one, level two, and a last level cache (LLC) 165, or any other configuration of the cache memory within the processor 110. In another embodiment, the computing system 100 includes a component, such as the processor 110, to employ execution units including logic to perform algorithms for processing data.

The memory controller 130 performs functions that enable the processor 110 to access and communicate with a main memory 120 that includes a volatile memory and/or a non-volatile memory. In one embodiment, the memory controller 130 is coupled to a system agent 180 that includes an MEE 150. In one embodiment, the MEE 150 is located between the last level cache 165 and the memory controller 130 to perform encryption, decryption and authentication of the CLs moving in and out of a protected region 125 of the main memory 120. The MEE 150 is located on the processor die, while the memory 120 is located off the processor die. In one embodiment, the MEE 150 processes multiple memory read requests in parallel to improve the access latency to the protected region 125.

In one embodiment, memory encryption can protect a confidentiality of memory-resident data on the main memory 120. Memory encryption is primarily designed to protect against passive attacks where an attacker tries to silently observe the CLs as the CLs move on and off the processor. Some processors include an encryption module that encrypts sensitive data before the data is stored into a protected region of the memory. For a memory read to the protected region, the CL is decrypted before being fed into the processor. The encryption and decryption algorithms can be chosen based on a security level required by the user.

In another embodiment, the main memory 120 can divided into regions, including one or more protected regions 125 (also referred to herein as a secure memory range or a MEE region). Each region has multiple sections, an enclave page cache (EPC) section, a hardware reserved section of replay-protection and integrity metadata, and another hardware-reserved section that is internal to implementation. In one embodiment, the protected region 125 may be a fixed range or multiple protected regions 125 may be a set of multiple fixed ranges. In another embodiment, the entire memory is configured as flexible memory, divided into multiple MEE regions 125. At startup, the entire memory starts as non-secure and the system software converts it as guided by the demand for secure memory on the system. As described herein, the main memory 120 may include multiple secure MEE regions and non-secure memory ranges. In one embodiment, a portion of the main memory 120 is secured. In another embodiment, the entire main memory 120 is secured memory.

One advantage of a computing system 100 using the MEE 150 is to provide a high level of security against hardware and software attacks. The MEE 150 can encrypt and decrypt data used by the computing system 100. In one embodiment, the MEE 150 uses counter-mode encryption to securely encrypt data. Counter-mode encryption requires that the seed be unique spatially and temporarily. Spatial uniqueness of the seed may be derived from the address of the data line, while the temporal uniqueness of the seed may be achieved by using the VER data associated with the data line. For example, the MEE 150 protects the CLs in the protected region 125 of the main memory 120 using a counter tree structure for counter-mode encryption.

In one example, a root of the tree is stored on-die and forms the root of trust (i.e., a trust boundary). The versions of the CLs are part of this counter tree structure. Alternatively, other protection mechanisms may be used for replay-protection. For example, Message Authentication Codes (MACs) associated with the secure CLs can be stored on-die. An advantage of storing on-die MACs associated with the secure CLs is to increase a security of the computing system and safeguard against hardware and software attacks. For example, when the MACs associated with the secure CLs are stored on-die, a successful replay attack would need to replay both the CL and its associated MAC.

For example, the MEE 150 performs counter mode encryption using an encryption seed that is unique for each CL. The encryption seed is a set of encryption parameters stored in protected memory used by the MEE 150 to encrypt or decrypt CLs. In one example, the encryption parameters include multiple unique encryption keys and a counter. The counter is incremented to provide a unique seed for encryption key for different CLs or cryptographic cache blocks (CCBs) in memory. The CCB is a set of CLs. In one example, the MEE 150 can use the encryption seed for counter mode encryption. In another example, the MEE 150 can use the encryption seed for counter mode decryption. In one embodiment, the encryption seed associated with each portion of data written to the main memory 120 is unique. For example, an encryption key is used to encrypt an encryption seed. In this example, each time data is written to the main memory 120, the encryption seed is different and the data will be uniquely encrypted. When two data portions are the same data, each of the two data portions are uniquely encrypted when they are written to the main memory 120.

In another example, the encryption parameters include a spatial parameter and a temporal parameter. The spatially unique parameter can be a parameter that uses a physical address of the CL or the CCB to be accessed. The temporally unique parameter can be a parameter that uses a counter that serves as a version (VER) of the CL. For example, the spatial parameter is the physical location of the CL and the temporal parameter is the VER that iterate through a series of numbers based on the physical location of the CL. The VER is associated with each CL or CCB in the main memory 120. In one embodiment, the series of numbers can be incremented with each write to memory 120. For example, a MEE can use a counter that counts up with each write to memory 120 to iterate through the series of numbers. In another embodiment, the series of numbers generated using the encryption seed can be a series of pseudo random numbers used to encrypt or decrypt data. In this example, the encryption seed is an input to an iterative function for encryption and decryption that iterates through the temporally and spatially unique parameters to different CLs.

The VER can be large enough to avoid overflowing to ensure that the same VER is not re-used. For example, the VER can be a 56-bit (b) counter. One advantage of the spatial and temporal uniqueness is that when the same data is written to memory at different locations, each data entry is encrypted to a different ciphertext. Additionally, integrity is afforded by associating a message authentication code (MAC) with each CL to ensure that while the data is resident in memory, the data cannot be modified without detection. In one example, the cryptographic MAC is 56 b in length to provide sufficient security strength.

To provide the high level of security, the MEE 150 uses storage overhead for security metadata. For example, the MEE 150 can use 25% storage overhead for secured data. In this example, the MEE 150 can protect 96 megabytes (MB) of data and use 32 MB for security metadata.

In view of a limited size of the main memory 120, a variety of schemes, separately or in combination, can be used to protect an application or sensitive information. In one scheme, an application identifies portions of the program that need protection and other portions of the program that do not need protection. In this scheme, the MEE 150 can protect the portions of the program needing protection and not protect the portions of the program not needing protection. In another protection scheme, a unique VER and a unique MAC are associated with each CL. In this scheme, the storage overheads can be reduced by increasing a total memory size for the CLs of the MEE 150. For example, the system CL size can be increased from 64 bytes (B) to 128 B to reduce the metadata overheads to half of the current overheads.

Another protection scheme is to reduce an amount of overhead storage used by the MEE 150. In one example, various processors may use a standard CL size for storage requirements. In this example, a number of CLs in a CCB of the MEE 150 can be increased to reduce the amount of overhead storage used for the standard CL size. The number of CLs in a CCB is referred to herein as a CCB granularity. The CCB is the basic unit of a cryptographic computation for the MEE. In one example, a VER and a MAC are associated with the CCB. The CCB represents a data size that is associated with a single VER and a single MAC.

In one embodiment, the MEE 150 can employ a tree-based protection built on the protected memory to provide replay protection. In one example, the tree is built on top of the VER associated with the protected CLs. In this example, the tree built on top of the VERs can reduce a size of each level compared to the previous level.

Figure 2:
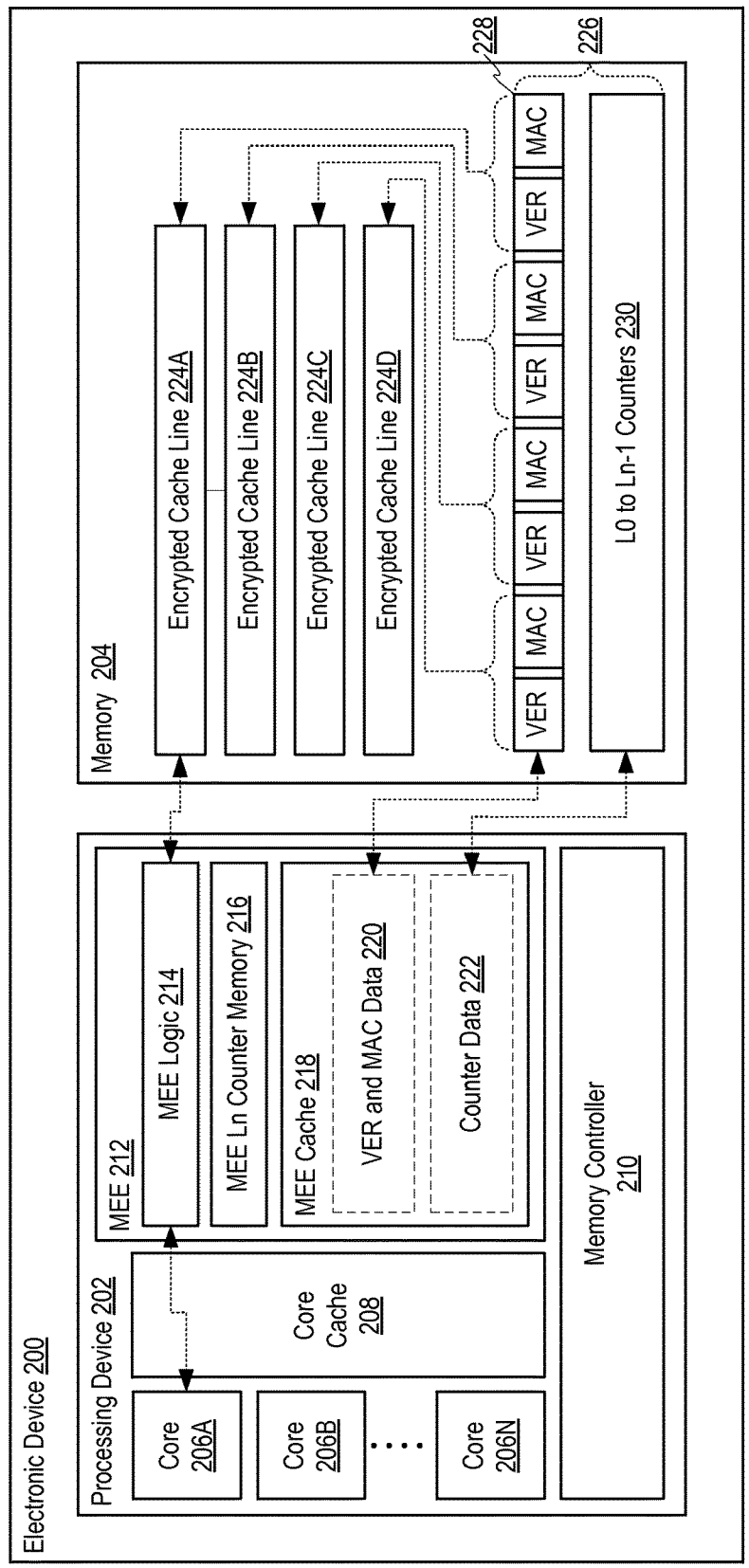
FIG. 2 illustrates an electronic device with an MEE according to one embodiment.

FIG. 2 illustrates an electronic device 200 with an MEE 212 according to one embodiment. The electronic device 200 may include a processing device 202, memory 204, power system, a user interface, and a communication interface. The processing device 202 may comprise at least cores 206A . . . N, core cache 208, memory controller 210, and MEE 212. The processing device 202 may include one or more processors on separate components, or alternatively one or more cores 206A, 206B, . . . 206N in a single component (e.g., in a System-on-a-Chip (SoC) configuration), along with processor-related support circuitry (e.g., bridging interfaces, etc.). The processing core 206A may perform data processing operations requiring data secured by a protection system such as SGX. Protected data such as encrypted data lines 224A-224D in memory 204 may be retrieved by MEE 212 and decrypted prior to being provided to core 206A. Likewise, confidential or otherwise sensitive data generated by core 206A may be encrypted by MEE 212 prior to being stored in memory 204.

The core cache 208 may include local volatile memory to hold data that may be utilized during a data processing operation. In one embodiment, the cache 208 may include multiple separate memory areas organized in levels with the outmost level being the last level cache (LLC).

The electronic device 200 may implement a trusted execution environment for protecting, at the micro-architectural level, the applications being executed by the processing system and the data being accessed by the applications. Such a processing system may comprise memory encryption engine (MEE) 212 for encrypting the data lines which are moved from an on-package memory 216 to a memory which is external with respect to the processor chip (such as the main system memory 204).

In one embodiment, the electronic device 200 may utilize Software Guard Extension (SGX) technology to protect at least a portion of memory 204. SGX may provide a secure, hardware-encrypted computation and storage area within system memory, the contents of which cannot be deciphered by privileged code or even through applying hardware probes to memory bus. In another embodiment, the electronic device 200 may utilize other security technologies.

The processing device 202 may be configured to execute various instructions in electronic device 200. Instructions may include program code configured to cause processing device 202 to perform activities related to reading data, writing data, processing data, formulating data, converting data, transforming data, etc. Information (e.g., instructions, data, etc.) may be stored in the memory 204. The memory 204 may comprise random access memory (RAM) and/or read-only memory (ROM) in a fixed or removable format. RAM may include volatile memory configured to hold information during the operation of electronic device 200 such as, for example, static RAM (SRAM) or Dynamic RAM (DRAM). ROM may include non-volatile (NV) memory configured based on BIOS, UEFI, etc. to provide instructions when electronic device 200 is activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc. The memory 204 can include at least encrypted CLs 224A . . . D and security metadata 226. The security metadata 226 includes VER and MAC CL 228 and L0 to Ln−1 counters 230.

As noted herein above, MEE 212 may implement at least two cryptographic protection mechanisms: encryption to defend against passive attacks and integrity/replay protection to defend against active attacks. Memory encryption is designed to defend against a class of hardware attacks wherein an attacker attempts to silently observe data lines as they move in and out of processing device 202. To defend against these attacks, MEE 212 may employ encryption to protect memory 204 (e.g., an MEE-specific region in memory 204). Before a data line moves to memory 204, it may be encrypted by MEE 212. For reads from memory 204, encrypted data lines 224A-224D may be decrypted by MEE 2112 prior to being delivered to cores 206A-206N.

Integrity and replay protection may involve defending again active attacks to data lines in memory 204. An active attack may involve changing data stored in memory 204 to elicit activity in device 200 that would otherwise not have happened.

In certain implementations, for each data line moved to external memory 204, MEE 212 may store a message authentication code (MAC) value associated with it. When the data line is read from external memory 204, its integrity may be verified by calculating the MAC value of the data line and comparing the calculated MAC value with the stored MAC value. Replay protection may be further provided by storing the version (VER) of the data line that is incremented each time when the data line is written back to the external memory.

In certain implementations, processing device 202 may further comprise a MEE cache that may be employed to transparently store copies of the most recently accessed MAC and VER lines such that future requests for those MAC and VER lines may be satisfied more efficiently.

Figure 3:
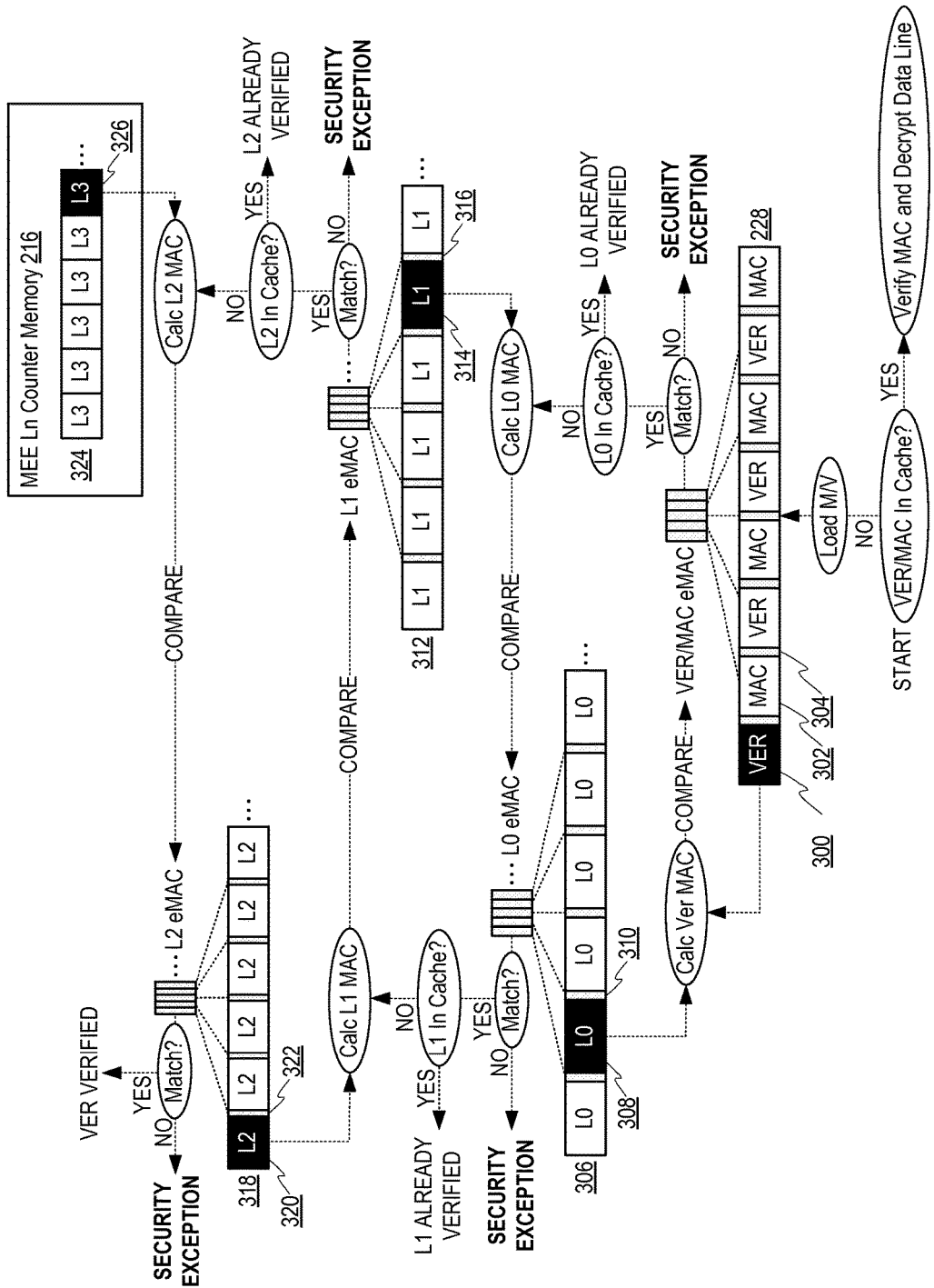
FIG. 3 illustrates a tree walk associated with reading data according to one embodiment.

FIG. 3 illustrates a tree walk associated with reading data according to one embodiment. The MEE logic 214 (illustrated in FIG. 2) may use different cryptographic protection mechanisms. In one example, the MEE logic 214 uses encryption to defend against passive attacks. In another example, the MEE logic 214 uses integrity/replay protection to defend against active attacks. Memory encryption is designed to defend against a class of hardware attacks wherein an attacker attempts to silently observe CLs as they move in and out of processing device 202. To defend against these attacks, MEE logic 214 may use encryption to protect the memory 204 (illustrated in FIG. 2) or a protected region 125 (illustrated in FIG. 1). Before a CL moves to the memory 204, it may be encrypted on-chip by MEE logic 214. For reads from the memory 204, encrypted CLs 224A . . . D may be decrypted by MEE logic 214 prior to being delivered to cores 206A . . . N.

The MEE logic 214 can use integrity and replay protection to defend against active attacks to CLs in the memory 204. An active attack may involve changing data stored in the memory 204 to elicit irregular or unscheduled activity in electronic device 200. A counter tree organization may be employed to protect the integrity and ensure replay protection of encrypted CLs 224A . . . D in the memory 204. An example counter tree may include VER and MAC CL 228, metadata nodes L0 304, L1 312 and L2 318, and top-level (e.g., L3) counters 324. The MAC 302 may be associated with encrypted CL 224D. When the encrypted CL 224D is written back to the memory 204, MAC 302 may be updated to reflect a measurement of the contents of encrypted CL 224D currently being stored in the memory 204. When the encrypted CL 224D is later read from memory, MEE logic 214 may verify that the contents of encrypted CL 224D have not been edited since last loaded using the MAC 302. Authentication utilizing MAC 302 protects against modification attacks on encrypted CL 224D while in memory 204 to ensure data integrity.

VER 300 is counter value-based "version" of encrypted CL 224D determined when encrypted CL 224D was last stored in the memory 204. VER 300 may be incremented each time encrypted CL 224D is written back to memory. Metadata nodes L0 306, L1 312 and L2 318 may comprise both counters and an embedded MAC (eMAC) computed based on the values of the counters. For example, highlighted counters 308, 314 and 320 may correspond to encrypted CL 224D. The eMAC is stored as segments situated between the counters in L0 306, L1 312 and L2 318. The eMACs may be formulated using a counter from the next higher level in the tree as an input. This may continue to the root or top-level L3 counters 324, which may be stored securely in the processing device 202.

L3 counters 324 may not be evicted from the processing device 202 and may be protected against attacks. The counter in each node L3 324, L2 318, L1 312 and L0 306 may act as a version for a following level ending with VER or MAC CLs 228 storing VER 300 corresponding to encrypted CLs 224A . . . D. When encrypted CL 224D is written, all of the counters corresponding to encrypted CL 224D (including L3 counter 326 and VER 300) are updated. The eMACs in each node are also updated since eMACs are computed using the values of all counters in the node. To ensure replay-protection, when loaded from memory 204 encrypted CL 224D may be authenticated based on MAC 302, which is formulated utilizing VER 300. VER 300 may be authenticated based on counters in nodes L0 304, L1 310 and L2 316 up to L3 counter 322. A mismatch may indicate a potential attack and may raise a security exception to defeat the potential attack.

In one embodiment, a tree walk can include loading L0 306, L1 312 and/or L2 318 into MEE cache 218 for authenticating VER 300 corresponding to encrypted CL 224D. The "START" indicates that the tree walk may begin with MEE cache 218 being checked to determine if VER 300 is present. When VER and MAC CLs 228, L0 304, L1 310 or L2 316 is present in MEE cache 218, the node has already been authenticated. For example, the node was authenticated in a prior tree walk for encrypted CL 224C, corresponding to another encrypted CL 224A . . . C. When the node has already been authenticated the tree walk may stop.

In one embodiment, when VER 300 already exists in MEE cache 218, then MAC 302 may be verified using VER 300. In one example, when MAC 302 is verified, the decryption of encrypted CL 224D may proceed. In another example, when VER 300 does not already exist in the MEE cache 218, then the tree walk may continue and the VER and MAC CLs 228 may be authenticated. Authentication may include calculating a MAC over VER and MAC CLs 228 and comparing the newly calculated MAC to VER and MAC eMAC 304. In one example, MAC 302 resides in VER and MAC CLs 228 and protects encrypted CL 224D. In another example, VER and MAC eMAC 304 protects VER and MAC CLs 228.

In one embodiment, the MAC for VER and MAC CLs 228 can be calculated using a cryptographic process where an encrypted value may be generated based on the address of VER and MAC CLs 228. When the encrypted value is generated, the counter value of the counter 308 in L0 node 306, an AES key, and MAC value is then generated by hashing the cryptographic value with all of the counter values in VER and MAC CLs 228. In one example, the VER and MAC CLs 228 may be authentic when the MAC for VER and MAC CL 228 matches VER and MAC eMAC 304. In another example, when the MAC does not match VER and MAC eMAC 304 then a security exception may occur. A security exception includes any security-related operation that intervenes to prevent the security of electronic device 200 from being compromised. For example, the security exception can halt MEE encryption and/or decryption operations for the encrypted CL 224D, restrict access to a protected memory space in the memory 204, or notify other systems of the electronic device 200.

In one embodiment, when L0 counter value 308 is used to calculate the MAC for VER and MAC CL 228, the MEE determines whether L0 304 was already loaded in MEE cache 218. When L0 was already in the cache, then L0 is verified and the tree walk may stop. When L0 is not already in the cache, L0 306 is verified. In one example, L0 306 is verified by calculating the MAC of L0 306 utilizing counter value 314 from L1 312. When the newly calculated MAC value matches L0 eMAC 310, then L0 may be deemed authentic. When the newly computed MAC does not match L0 eMAC 310, then a security exception may occur.

Figure 4:
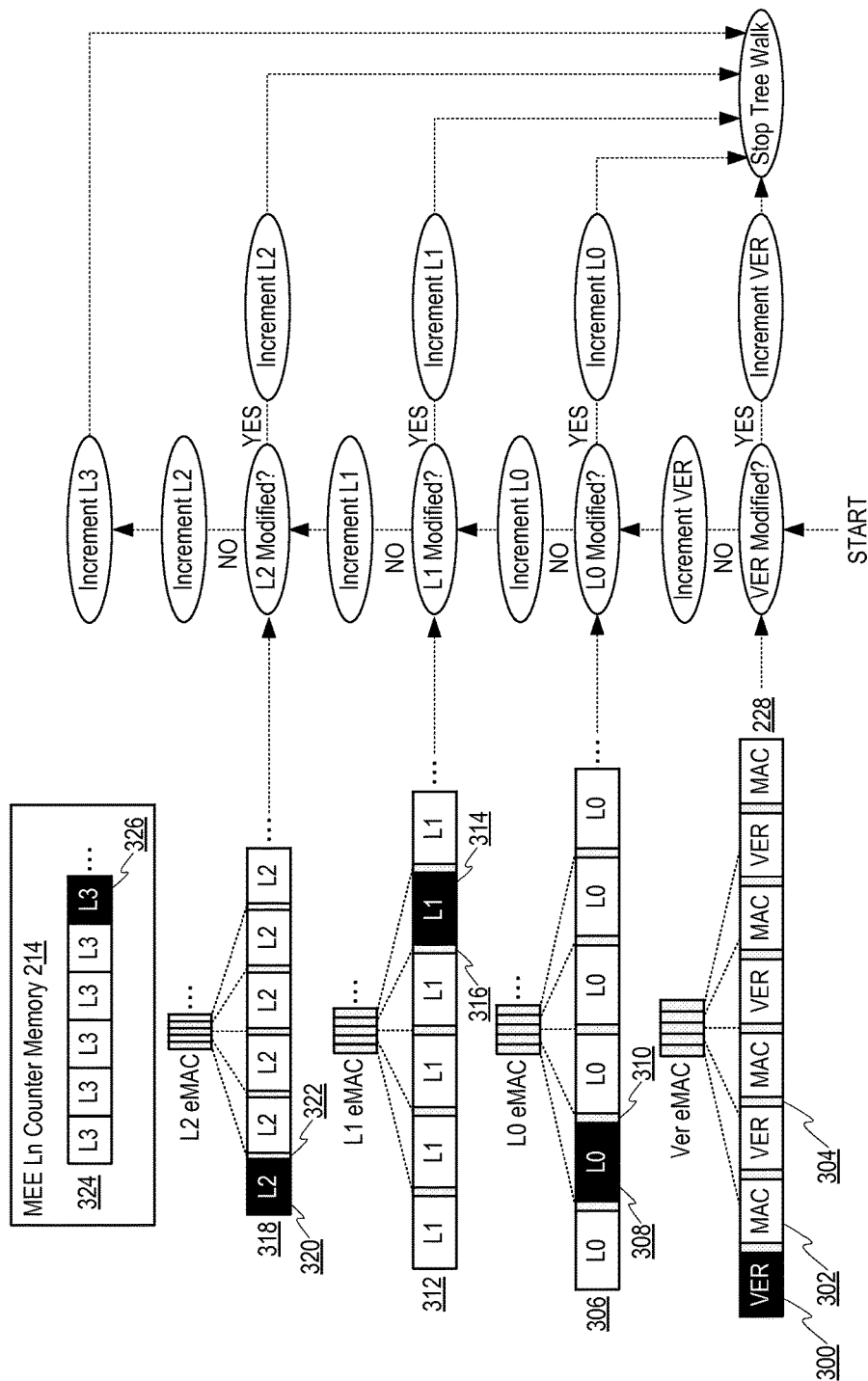
FIG. 4 illustrates an example of a tree walk associated with writing data according to one embodiment.

FIG. 4 illustrates an example of a tree walk associated with writing data according to one embodiment. In one embodiment, when data is being encrypted and stored in the memory 204 (e.g., as encrypted CL 224D), each node in the replay tree are incremented. For example, all of the counters for each node are incremented. In another embodiment, for MEE cache 218, the tree walk can stop without climbing to L3 324 and without incrementing all of the associated replay tree levels. In one example, for a read request, the tree walk can stop a tree level already exists in MEE cache 218. In another example, for a write request, the tree walk may stop when a node is found in a modified state in the cache. In one example, each node L2 318, L1 312 and L0 306 in the MEE cache 218 may maintain a bit to indicate if it was written to by a previous request. The bit may be set to indicate that the copy of the node L2 318, L1 312 or L0 306 in MEE cache 218 has been modified. For example, the node L2 318, L1 312 or L0 306 can be modified by another encryption request. A cached node in modified state indicates that a previous write already updated the higher-level nodes in the tree and that the walk does not need to continue to higher levels to increment nodes. When modified nodes are evicted out MEE cache 218, the eMAC is re-computed to reflect the latest data being written back to memory 204. Each eMAC computation uses a counter value in the next higher level and computes the eMAC over the contents of the node corresponding to the eMAC.

When modified nodes in MEE cache 218 are accounted for, the nodes L2 318, L1 312 or L0 306 must be traversed until a determination is made that a node has been modified. Each node from L0 306 to L3 324 may be traversed looking for a version in MEE cache 218 that has been modified. In one example, when a node is not located in MEE cache 218 during the tree walk, the node may be loaded into MEE cache 218 from the memory 204. In each level traversal, the node is incremented. In another example, when a node is determined to be modified the tree walk stops after the modified node is incremented. When no modified nodes are found in MEE cache 218, the tree walk may stop after incrementing counter 326 in L3 324. When the CL is encrypted and written to the memory 204 (e.g., as encrypted CL 224D), eMACs 322, 316, 310 and 304 can be recalculated. VER 300 may be utilized to recalculate the MAC 304. The VER 300 can be used to encrypt the data as encrypted CL 224D. Encrypted CL 224D may then be stored in the memory 204.

Figure 5:
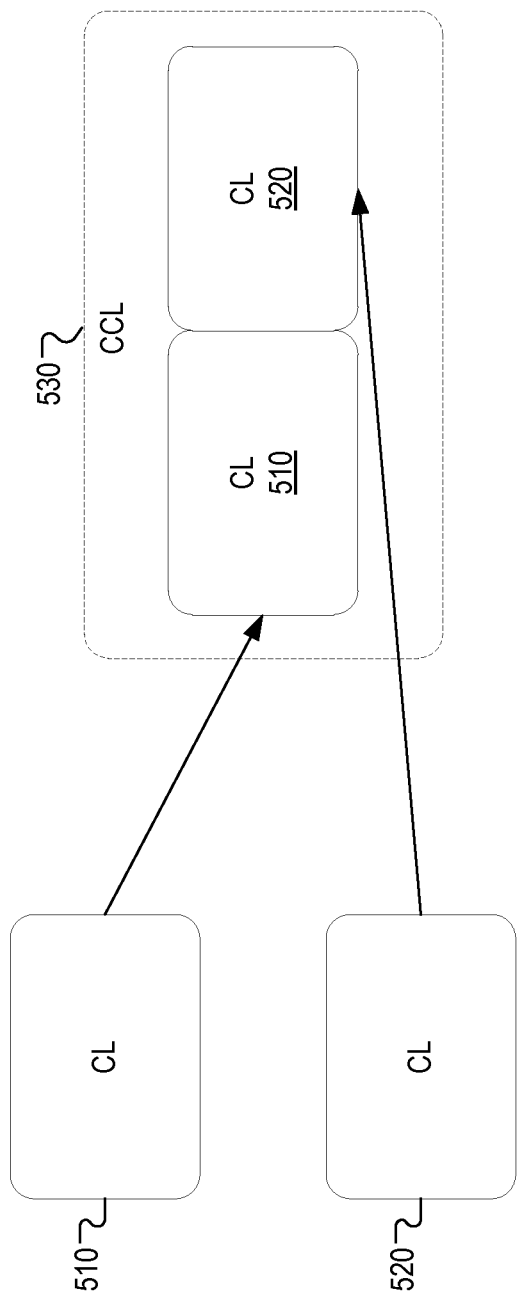
FIG. 5 shows illustrates a CCB with CLs according to one embodiment.

FIG. 5 shows illustrates a CCB 530 with CLs 540 and 550 according to one embodiment. The memory 120 (illustrated in FIG. 1) includes a CL 510 and a CL 520. The MEE 150 (illustrated in FIG. 1) combines the CL 510 and the CL 520 to form a CCB 530 with a granularity of 2. A single VER and a single MAC is associated the CCB 530. A unique VER and a unique MAC is associated with the CCB 530 reduces the overall storage overhead to half of the overhead compared to a memory 120 with a first VER and a first MAC associated with CL 510 and a second VER and a second MAC with CL 520. An advantage of increasing the CL granularity is to maintain the same CL size and reduce the amount of overhead storage used by the MEE 150. The number of CLs in a CCB is not intended to be limiting. A number of CLs of a CCB can vary as the granularity of the CCB changes. For example, a CCB with a granularity of 4 has 4 CLs and a CCB with a granularity of 8 has 8 CLs.

FIG. 6A illustrates a memory 600 with each CL 650 is associated with a unique MAC 620 and a unique VER 630 according to one embodiment. The memory 600 includes data 610, MACs 620, VERs 630, and address mappings 640. The data includes multiple CLs 650. Each CL 650 of the data 610 can have a unique physical address. The unique physical address can be associated with a unique address mapping 640 to higher levels in a tree. Each MAC 620 can be associated with the unique address mappings (L0-LN) 640. In one example, L0-LN can be different tree levels in the tree that are calculated by shifting down the previous level's address. For example, a current tree level of L1 can be calculated by shifting down a tree level of L0 by 3, e.g., a ⅛th compression for each tree level.

In one embodiment, MAC 622 can be associated with the address mappings for the different CLs 650 of the data 610. Each VER 630 can be associated with unique address mappings (L0-LN) 640. In another embodiment, VER 632 can include different VER segments associated with the address mappings for different CLs 650 of the data 610. For example, the data 610 can include 32 CLs 650. In this example, each VER 632 can have different versions for 8 CLs 650 of the data 610, e.g., a first VER 632 has 8 versions for CLs 650 one through eight of data 610, a second VER 632 has 8 versions for CLs 650 nine through seventeen and so forth. Each address mapping 640 can be associated with 8 CLs 650 of the data 610 and each counter line can be associated with a MAC 622.

FIG. 6B illustrates the memory 600 with each CCB 660 associated with a unique MAC 620 and a unique VER 630 according to one embodiment. The memory 600 includes data 610, MACs 620, VERs 630, and address mappings 640. The data 610 includes multiple CCBs 660. Each CCB 660 includes a first CL 670 and a second CL 680. Each CCB 660 of the data 610 can have a unique address. The unique address can be associated with a unique address mapping 640.

Each MAC 620 can include multiple MAC segments associated with the unique address mappings (L0-LN) 640. In one embodiment, MAC 622 can be associated with the address mappings for different CCBs 660 of the data 610. Each VER 630 can be associated with unique address mappings (L0-LN) 640. In another embodiment, VER 632 can include different VER segments associated with the address mappings for different CCBs 660 of the data 610. For example, the data 610 can include 32 CLs 650 and 16 CCBs 660 including 2 CLs 650 each. In this example, each VER 632 can have different versions for 8 CCBs 660 of the data 610, e.g., a first VER 632 has 8 versions for CCBs 660 one through eight of data 610, a second VER 632 has 8 versions for CCBs 660 nine through seventeen and so forth. Each address mapping 640 can be associated with 8 CCBs 660 of the data 610 and each counter line can be associated with a MAC 622.

In one example, a seed is associated with each CCB 660. The seed has temporal uniqueness using the physical address of the CCB 660 and spatial uniqueness using the VER as components of the seed. In another example, The MEE 150 (illustrated in FIG. 1) uses the counter mode encryption (as discussed in the preceding paragraphs) to de-couple a cryptographic operation from the data 610. One advantage of associating the MAC segments and the VER segments with the CCBs 660 is to reduce the number of MACs 620 and VERs 630 used to identify each CL. For example, the overhead storage reduction achieved by using CCBs is directly correlated to the CCB granularity as follows: Storage Overheads with CCB=(Storage overheads with unique mapping per CL)/(CCB Granularity).

FIG. 7A illustrates a seed 710 for a CL and a seed 720 for a CCB according to one embodiment. The MEE 150 (illustrated in FIG. 1) can use the idx 716 with the VER 718 and the physical address 714 of the CL to generate the seed 710. The seed 710 includes zeros for upper bits 712, a physical address 714 for the CL, a chunk index (idx) 716, and a VER 718 for the CCB.

In one embodiment, the seed 710 is used to encrypt or decrypt a CL in memory. For example, different seeds 710 have temporal and spatial uniqueness associated with each CL. The temporal and spatial uniqueness for each seed 710 is achieved by using the physical address 714 of the CL and the VER as components of the seed. In one embodiment, the seed 710 is encrypted to generate a cryptographic pad that is XORed with the plaintext to generate the ciphertext for write instruction. In another embodiment, the seed 710 is encrypted to generate a cryptographic pad that is XORed with the ciphertext to generate the plaintext for a read instruction. For example, the data lines may be encrypted using the Advanced Encryption Standard (AES) counter-encryption method, according to which an exclusive OR (XOR) operation may be performed between the data to be encrypted or decrypted and a "cryptopad" generated based on a seed:

Cipher text=Plain text ⊕ Cryptopad,
Cryptopad=AESk (Seed),
where ⊕ denotes exclusive or (XOR) operation, and
AES is an encryption operation based on the Advanced Encryption Standard and k indicates the key size specifying the number of repetitions of transformation rounds that convert the seed into the cryptopad.

To generate the seed 720 for a CCB, the MEE 150 can use a same VER value 728 to encrypt or decrypt multiple CLs in a CCB, similar to the decryption of a single CL using the seed 710. In one embodiment, the MEE 150 can operate at a 16 B granularity where an advanced encryption standard (AES) uses 16 B blocks. The seed 720 includes zeros for upper bits 722, a physical address 724 for the CL, a chunk index (idx) 726, and a version counter 728 for the CCB.

In one example, the seed 720 is unique for the CCB in order to ensure security of the counter-mode encryption. In one embodiment, to achieve this uniqueness, the MEE 150 uses the idx 726 with the VER and physical address of the CCB to form the seed 720. In another embodiment, the current MEE uses a 2 b field for the idx 726. The idx field for the CCB can be extended from the 2 b idx field for the seed 710 to a 3 b idx field to enable the idx 726 to be unique across the CCB. The size of the idx 726 can be extended based on a granularity of the CCB.

FIG. 7B illustrates an alternative seed 730 for a CCB according to one embodiment. The seed 710 for the CL in FIG. 7B is the same as the seed 710 illustrated in FIG. 7A. The seed 730 for the CCB in FIG. 7B is substantially the same as the seed 720 illustrated in FIG. 7A. In one embodiment, the idx for the seed 730 is the same size as the seed 710 (e.g., not extended). In this embodiment, the physical address 734 could be switched across the CLs and the idx 736 can be unique within the CCB. The MEE 150 can concatenate the physical address 734 with the idx 736 to generate a unique seed for each CCB.

Figure 8A:
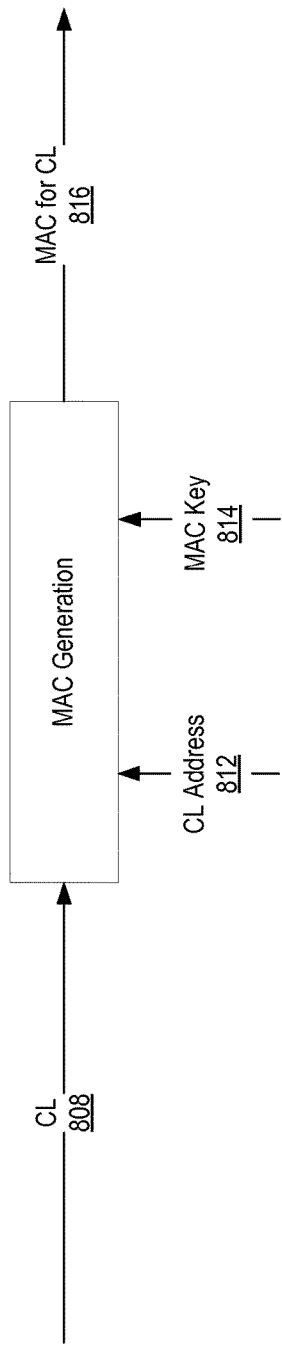
FIG. 8A illustrates an MEE generating a MAC for a CL according to one embodiment.

FIG. 8A illustrates an MEE 150 (illustrated in FIG. 1) generating a MAC 816 for a CL 808 according to one embodiment. In one embodiment, the MEE 150 receives a physical address 812 of the CL 808 and a MAC key 814 for the CL. The MEE 150 can use the physical address 812 and the MAC key 814 to generate a MAC 816 for the CL 808 using a MAC generation algorithm.

Figure 8B:
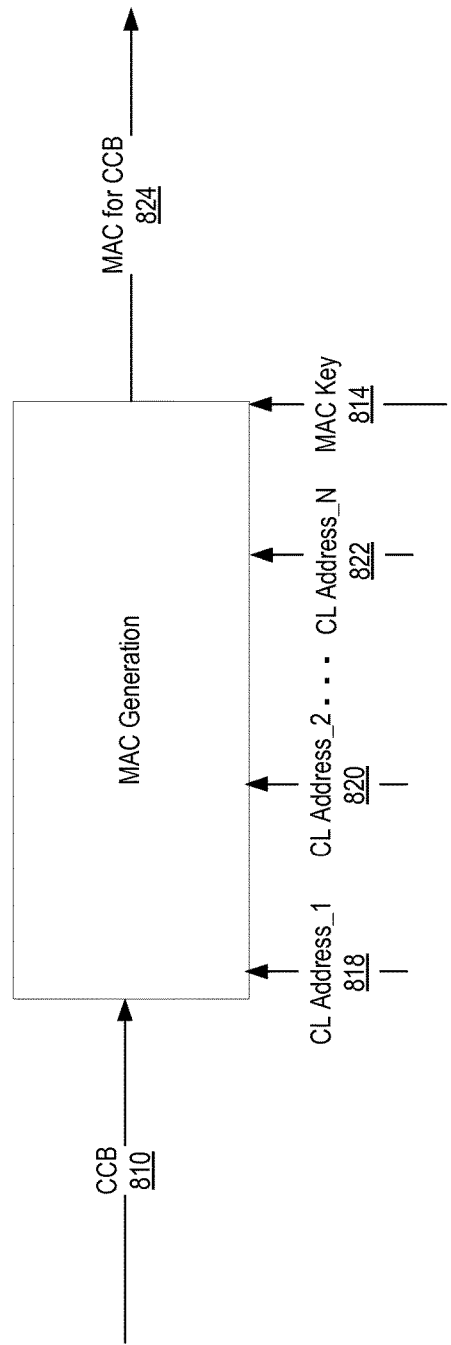
FIG. 8B illustrates the MEE generating a MAC for a CCB according to one embodiment.

FIG. 8B illustrates the MEE 150 (illustrated in FIG. 1) generating a MAC 824 for a CCB 810 according to one embodiment. In one embodiment, the MEE 150 receives a first physical address 818 for a first CL (CL Address_1), a second physical address 820 for a second CL (CL Address_2), and so forth through a Nth physical address 822 for an Nth CL (CL Address_N) of a CCB. The MEE 150 also receives a MAC key 814 for the CCB 810. In one example, a number of the physical addresses are based on a number of CLs in the CCB. The MEE 150 can use the physical addresses 818 through 822 and the MAC key 814 to generate a MAC 824 for the CCB 810 using the MAC generation algorithm.

Figure 9:
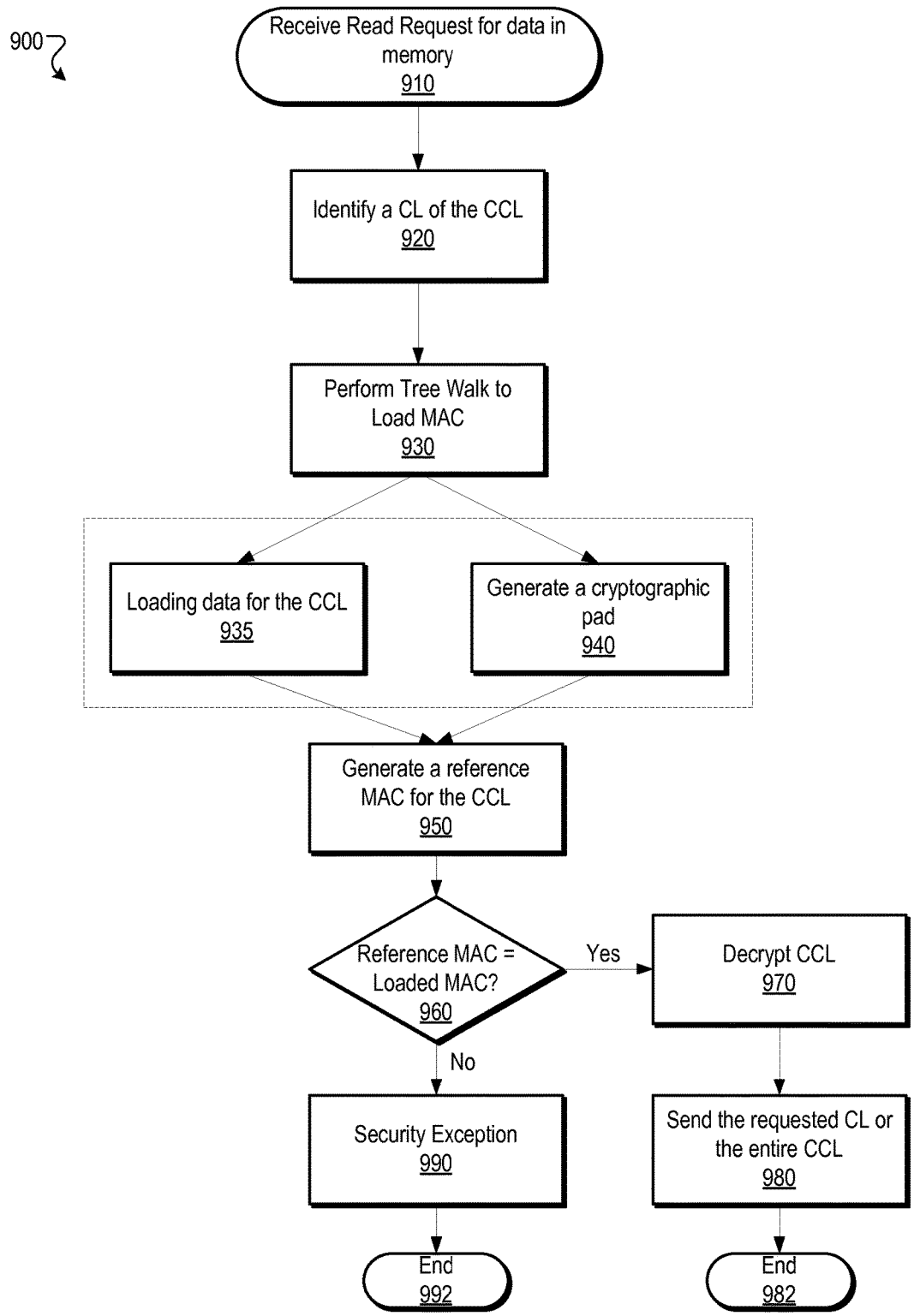
FIG. 9 depicts a flow diagram of a method to read a CCB or a CL in a memory according to one embodiment.

FIG. 9 depicts a flow diagram of a method 900 to read a CCB or a CL in a memory according to one embodiment. Method 900 may be performed by a computer system or an MEE that may comprise hardware (e.g., circuitry, dedicated logic, and/or programmable logic), software (e.g., instructions executable on a computer system to perform hardware simulation), or a combination thereof. Method 900 and/or each of its functions, routines, subroutines, or operations may be performed by one or more physical processors of the computer system executing the method. Two or more functions, routines, subroutines, or operations of method 900 may be performed in parallel or in an order which may differ from the order described above. In certain implementations, method 900 may be performed by a single processing thread. Alternatively, method 900 may be performed by two or more processing threads, each thread executing one or more individual functions, routines, subroutines, or operations of the method. In an illustrative example, the processing threads implementing method 900 may be synchronized (e.g., using semaphores, critical sections, and/or other thread synchronization mechanisms). Alternatively, the processing threads implementing method 900 may be executed asynchronously with respect to each other.

Referring to FIG. 9, the method 900 may begin with a processor or software library (such as a runtime library) executed by the processor receiving, at an MEE, a read request from an application for data in a memory of the MEE (910). The method can include identifying a CL of the CCB requested in the content read instruction (920). The method can also include performing, by the processor, a tree walk to load a MAC to a memory of the MEE (930). In one embodiment, the tree walk can include the MEE loading, from a cryptographic tree, tree nodes with security metadata. The security metadata can include a first message authentication code (MAC), version (VER) data, and counter data. The tree walk can also include authenticating, using the first MAC, that encrypted data in the memory was not modified while resident in the memory. In one example, the encrypted data is not modified when the integrity of the encrypted data is verified. In another example, the encrypted data is not modified when the encrypted data has not been replayed. The tree walk can also include authenticating, using the counter data, that VER data in the memory was not modified while resident in the memory. In one example, the VER data is not modified when the integrity of the VER data is verified. In another example, the encrypted data is not modified when the VER data has not been replayed.

The method can further include loading, from the memory, data from the CCB, where the CCB comprises a multiple CLs (935). The method can further include generating, by the processor, a cryptographic pad for the CLs (940). In one embodiment, the loading of the data from the CCB (935) and the generating the cryptographic pad for the CLs (940) can be performed in parallel. In another embodiment, the loading of the data from the CCB (935) and the generating the cryptographic pad for the CLs (940) can be performed sequentially. The method can further include generating a second MAC for the CCB loaded from the memory (950). The method can further include comparing the first MAC with the second MAC to determine whether the reference MAC matches the loaded MAC (960). The method can further include decrypting, by the processor, the CCB using security metadata when the first MAC matches the second MAC (970). The method can further include sending, to the application, the decrypted CCB or the identified CL of the decrypted CCB (980). The method can further include ending the read request instruction when the decrypted CCB or the identified CL is sent (982). The method can further include determining that a security exception has occurred when the first MAC does not match the second MAC (990). The method can further include ending the read request instruction when the security exception occurs (992).

Figure 10:
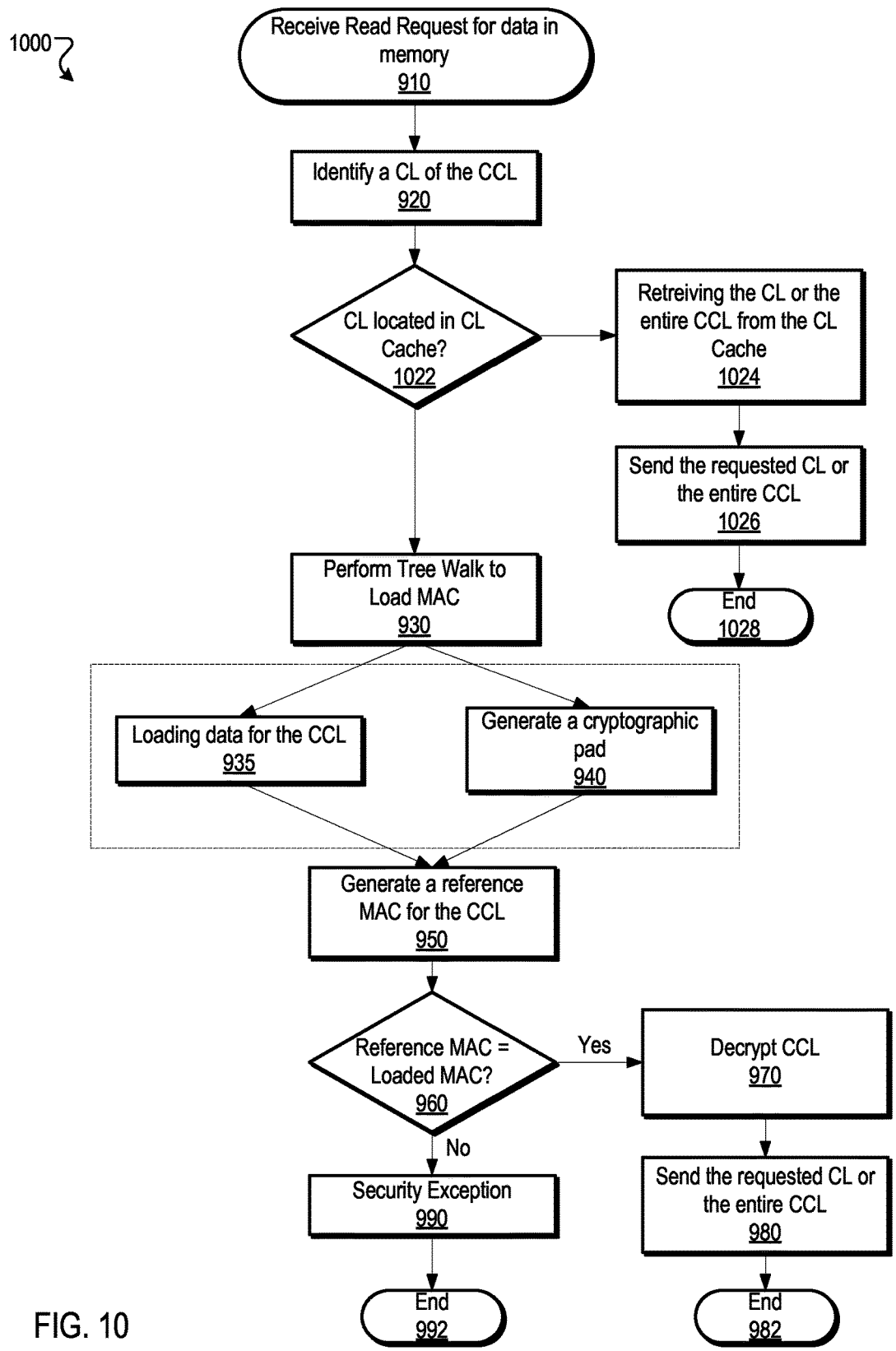
FIG. 10 depicts a flow diagram of a method to read a CCB or a CL in a PCL cache according to one embodiment.

FIG. 10 depicts a flow diagram of a method 1000 to read a CCB or a CL in a PCL cache according to one embodiment. Method 1000 may be performed by a computer system or an MEE that may comprise hardware (e.g., circuitry, dedicated logic, and/or programmable logic), software (e.g., instructions executable on a computer system to perform hardware simulation), or a combination thereof. Method 1000 and/or each of its functions, routines, subroutines, or operations may be performed by one or more physical processors of the computer system executing the method. Two or more functions, routines, subroutines, or operations of method 1000 may be performed in parallel or in an order which may differ from the order described above. In certain implementations, method 900 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processing threads implementing method 1000 may be executed asynchronously with respect to each other.

Referring to FIG. 10, the method 1000 is substantially similar to FIG. 9. The method 1000 may begin with a processor or software library (such as a runtime library) executed by the processor receiving, at an MEE, a read request for data in a memory of the MEE. The method can further include identifying a CL of the CCB requested in the content read instruction (920). The method can further include determining whether the identified CL is stored in the CL cache (1022). The method can further include retrieving the CL or the entire CCB from the CL cache when the identified CL is stored in the CL cache (1024). The method can further include sending, to the application, the entire CCB or the identified CL of the CCB (1026). The method can further include ending the read request instruction when the identified CL is sent (1028). In one example, the CL or the entire CCB stored in the CL cache was previously decrypted prior to storing the CCB in the CL cache. For example, the MEE 150 (illustrated in FIG. 1) can perform the read request of method 900. When the CCB is decrypted (970), the MEE 150 can send the requested CL to the application.

In one embodiment, where the CCB includes two or more CLs, the additional CL(s) is discarded. In another embodiment, where the CCB includes two or more CLs, the additional CL(s) is stored in the CL cache. The additional CL(s) can be stored in the CL cache to enable prefetching of data. For example, when the application exhibits spatial locality, the application uses data in the memory in consecutive memory locations. Where the MEE 150 retrieves and decrypts all the CLs in the CCB, the CLs that are subsequent in order to the physical address of the identified CL can be cached in the CL cache for prefetching. The MEE can fetch the subsequent CLs stored in the CCBas the application identifies the CLs in subsequent read requests. One advantage of prefetching CLs is to increase a performance of the MEE. For example, when the CL cache includes a CL identified in the read request, the MEE can avoid retrieving the CL from memory, comparing MACs, decrypting the CCB to send the identified CL, thereby increasing the MEE performance by avoid additional processing. The steps 930-992 of method 1000 are the same steps as in method 900. For example, when the identified CL is not in the CL cache, the processor can perform the steps 930-992.

Figure 11:
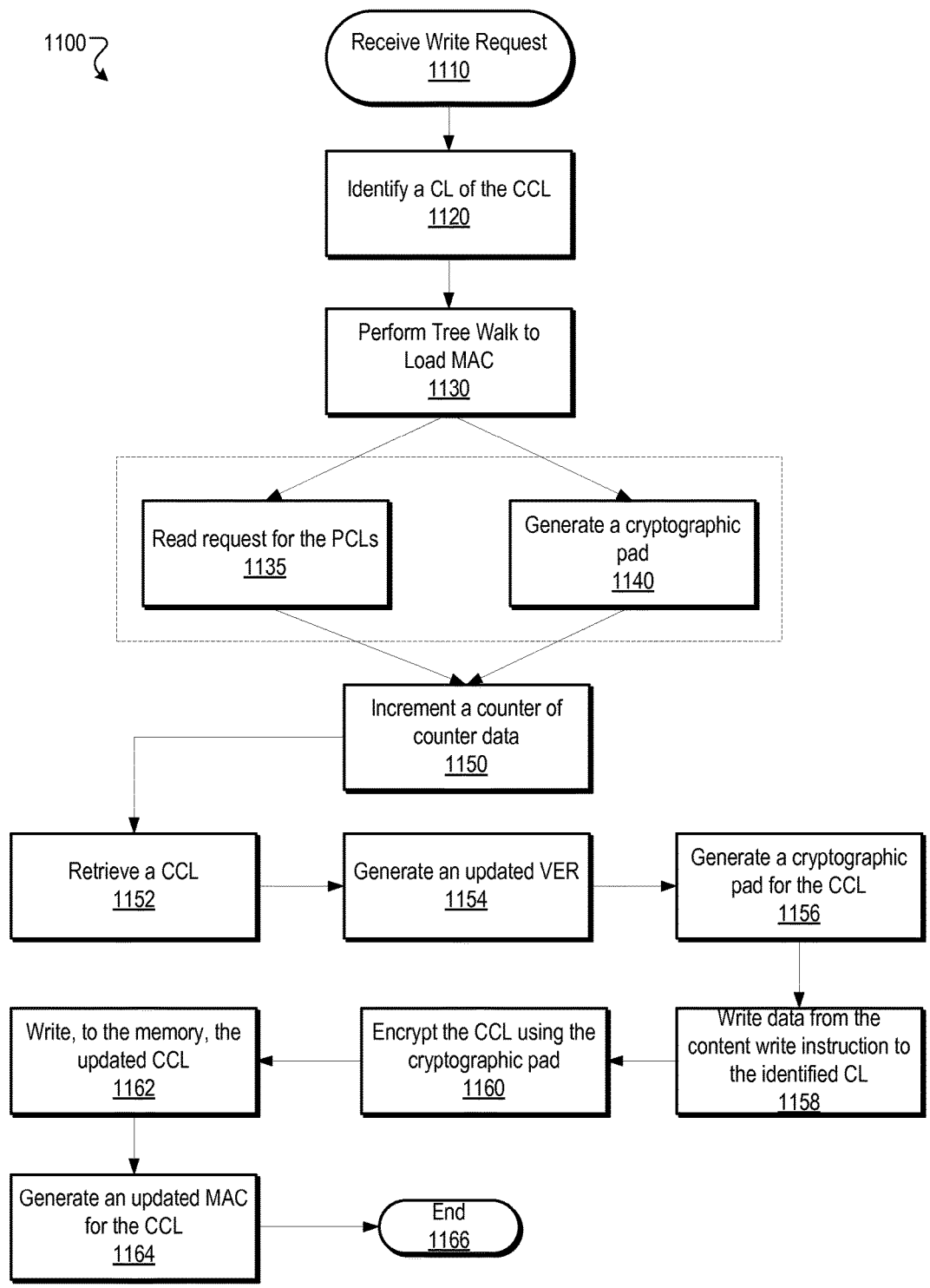
FIG. 11 depicts a flow diagram of a method to write a CCB or a CL in a memory according to one embodiment.

FIG. 11 depicts a flow diagram of a method 1100 to write a CCB or a CL in a memory according to one embodiment. Method 1100 may be performed by a computer system or an MEE that may comprise hardware (e.g., circuitry, dedicated logic, and/or programmable logic), software (e.g., instructions executable on a computer system to perform hardware simulation), or a combination thereof. Method 1100 and/or each of its functions, routines, subroutines, or operations may be performed by one or more physical processors of the computer system executing the method. Two or more functions, routines, subroutines, or operations of method 1100 may be performed in parallel or in an order which may differ from the order described above. In certain implementations, method 1100 may be performed by a single processing thread. Alternatively, method 1100 may be performed by two or more processing threads, each thread executing one or more individual functions, routines, subroutines, or operations of the method. In an illustrative example, the processing threads implementing method 1100 may be synchronized (e.g., using semaphores, critical sections, and/or other thread synchronization mechanisms). Alternatively, the processing threads implementing method 1100 may be executed asynchronously with respect to each other.

Referring to FIG. 11, the method 1100 may begin with a processor or software library (such as a runtime library) executed by the processor receiving, from an application, a write request for a CCB or a CL at an MEE (1110). The method can include identifying a CL of a CCB requested in the content write instruction (1120). The method can also include performing, by the processor, a tree walk to load a MAC to a memory of the MEE (1130). In one embodiment, the tree walk can include loading, from a cryptographic tree, tree nodes with security metadata, where the security metadata can include a first message authentication code (MAC), version (VER) data, and counter data. The tree walk can also include authenticating, using the first MAC, that encrypted data in the memory was not modified while resident in the memory. The tree walk can also include authenticating, using the counter data, that VER data in the memory was not modified while resident in the memory.

The method can further include loading, from the memory, data from the CCB, where the CCB includes multiple CLs (1135). The method can further include generating, by the processor, a cryptographic pad for the CLs (1140). In one embodiment, the loading of the data from the CCB (1135) and the generating the cryptographic pad for the CLs (1140) can be performed in parallel. In another embodiment, the loading of the data from the CCB (1135) and the generating the cryptographic pad for the CLs (1140) can be performed sequentially. The method can further include incrementing a counter of the counter data (1150). The method can further include retrieving, from the memory, a CCB (1152). The method can further include generating an updated VER (1154). The method can further include generating a cryptographic pad for the CCB using updated VER associated with the CCB (1156). The method can further include writing data from the content write instruction to the identified CL (1158). The method can further include encrypting the CCB using the cryptographic pad (1160). The method can further include writing, to the memory, the updated CCB (1162). The method can further include generating an updated MAC for the CCB (1164). The method can further include ending the write request instruction (1166).

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following example implementations may be described with reference to energy conservation and energy efficiency in specific integrated circuits, such as in computing platforms or microprocessors, other example implementations are applicable to other types of integrated circuits and logic devices. Similar techniques and teachings of example implementations described herein may be applied to other types of circuits or semiconductor devices that may also benefit from better energy efficiency and energy conservation. For example, the disclosed example implementations are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the example implementations of methods, apparatus', and systems described herein (whether in reference to hardware, firmware, software, or a combination thereof) are vital to a 'green technology' future balanced with performance considerations.

Although the following example implementations are described with reference to a processor, other example implementations are applicable to other types of integrated circuits and logic devices. Similar techniques and teachings of example implementations of the present disclosure can be applied to other types of circuits or semiconductor devices that can benefit from higher pipeline throughput and improved performance. The teachings of example implementations of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of example implementations of the present disclosure rather than to provide an exhaustive list of all possible implementations of example implementations of the present disclosure.

Although the below examples describe instruction handling and distribution in the context of execution units and logic circuits, other example implementations of the present disclosure can be accomplished by way of a data or instructions stored on a machine-readable, tangible medium, which when performed by a machine cause the machine to perform functions consistent with at least one example implementation of the present disclosure. In one example implementation, functions associated with example implementations of the present disclosure are embodied in machine-executable instructions. The instructions can be used to cause a general-purpose or special-purpose processor that is programmed with the instructions to perform the steps of the present disclosure. Example implementations of the present disclosure may be provided as a computer program product or software which may include a machine or computer-readable medium having stored thereon instructions which may be used to program a computer (or other electronic devices) to perform one or more operations according to example implementations of the present disclosure. Alternatively, steps of example implementations of the present disclosure might be performed by specific hardware components that contain fixed-function logic for performing the steps, or by any combination of programmed computer components and fixed-function hardware components.

Instructions used to program logic to perform example implementations of the present disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of example implementations of the present disclosure.

In modern processors, a number of different execution units are used to process and execute a variety of code and instructions. Not all instructions are created equal as some are quicker to complete while others can take a number of clock cycles to complete. The faster the throughput of instructions, the better the overall performance of the processor. Thus it would be advantageous to have as many instructions execute as fast as possible. However, there are certain instructions that have greater complexity and require more in terms of execution time and processor resources. For example, there are floating point instructions, load/store operations, data moves, etc.

As more computer systems are used in internet, text, and multimedia applications, additional processor support has been introduced over time. In one example implementation, an instruction set may be associated with one or more computer architectures, including data types, instructions, register architecture, addressing modes, memory architecture, interrupt and exception handling, and external input and output (I/O).

In one example implementation, the instruction set architecture (ISA) may be implemented by one or more micro-architectures, which includes processor logic and circuits used to implement one or more instruction sets. Accordingly, processors with different micro-architectures can share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one example implementation, registers may include one or more registers, register architectures, register files, or other register sets that may or may not be addressable by a software programmer.

In one example implementation, an instruction may include one or more instruction formats. In one example implementation, an instruction format may indicate various fields (number of bits, location of bits, etc.) to specify, among other things, the operation to be performed and the operand(s) on which that operation is to be performed. Some instruction formats may be further broken defined by instruction templates (or sub formats). For example, the instruction templates of a given instruction format may be defined to have different subsets of the instruction format's fields and/or defined to have a given field interpreted differently. In one example implementation, an instruction is expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one example implementation, Single Instruction Multiple Data (SIMD) refers to a type of instruction that causes a processor to perform an operation on multiple data elements. SIMD technology may be used in processors that can logically divide the bits in a register into a number of fixed-sized or variable-sized data elements, each of which represents a separate value. For example, in one example implementation, the bits in a 64-bit register may be organized as a source operand containing four separate 16-bit data elements, each of which represents a separate 16-bit value. This type of data may be referred to as 'packed' data type or 'vector' data type, and operands of this data type are referred to as packed data operands or vector operands. In one example implementation, a packed data item or vector may be a sequence of packed data elements stored within a single register, and a packed data operand or a vector operand may a source or destination operand of a SIMD instruction (or 'packed data instruction' or a 'vector instruction'). In one example implementation, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one example implementation, destination and source registers/data are generic terms to represent the source and destination of the corresponding data or operation. In some example implementations, they may be implemented by registers, memory, or other storage areas having other names or functions than those depicted. For example, in one example implementation, "DEST1" may be a temporary storage register or other storage area, whereas "SRC1" and "SRC2" may be a first and second source storage register or other storage area, and so forth. In other example implementations, two or more of the SRC and DEST storage areas may correspond to different data storage elements within the same storage area (e.g., a SIMD register). In one example implementation, one of the source registers may also act as a destination register by, for example, writing back the result of an operation performed on the first and second source data to one of the two source registers serving as a destination registers.

Figure 12:
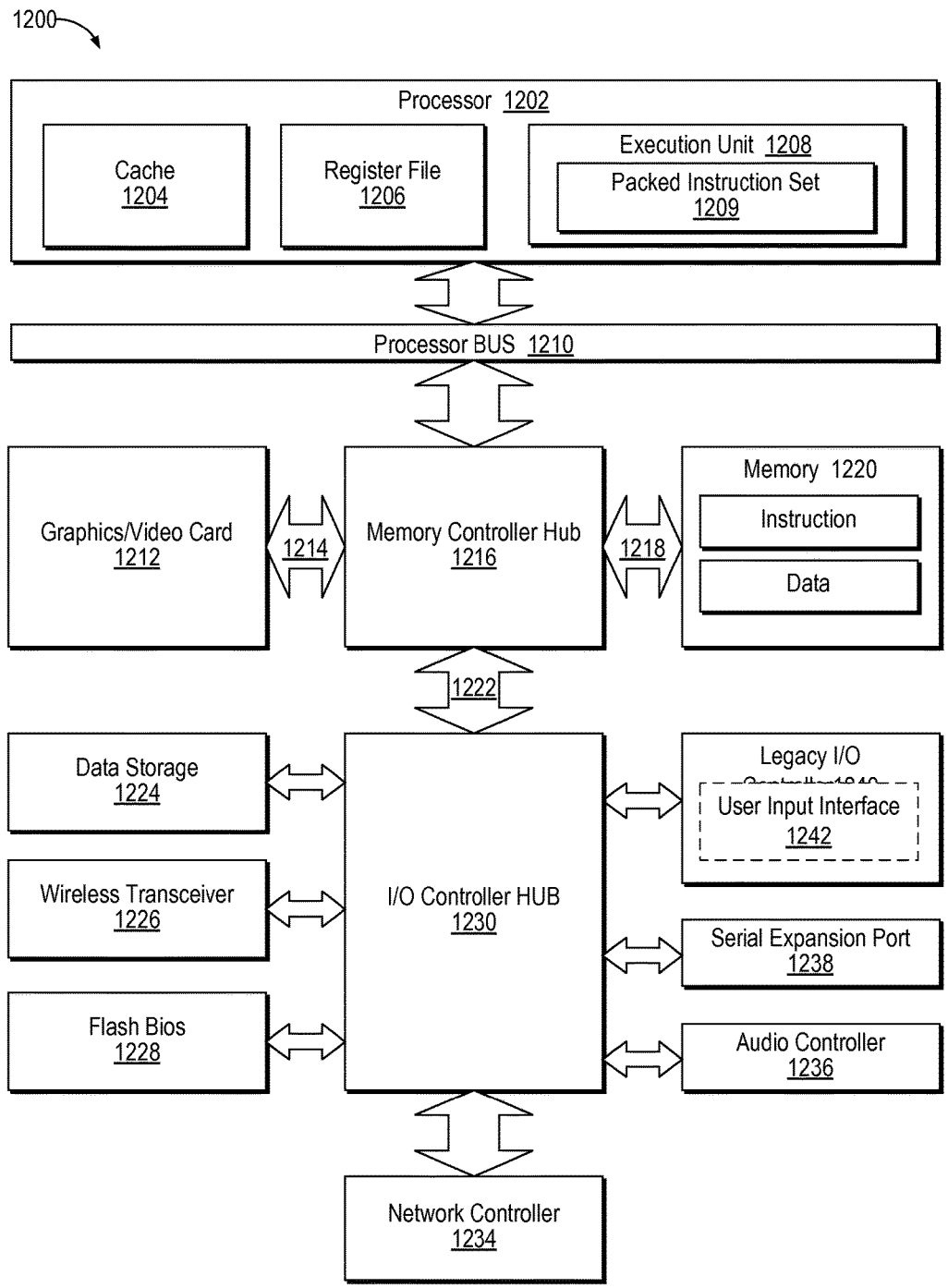
FIG. 12 schematically illustrates a block diagram of a system according to one embodiment.

Turning to FIG. 12, a block diagram of an exemplary computer system formed with a processor that includes execution units to execute an instruction, where one or more of the interconnects implement one or more features in accordance with one example implementation of the present disclosure is illustrated. System 1200 includes a component, such as a processor 1202 to employ execution units including logic to perform algorithms for process data, in accordance with the present disclosure, such as in the example implementation described herein. System 1200 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one example implementation, sample system 1200 executes a version of the WINDOWS™ operating system available from Microsoft Corporation of Redmond, Wash., although other operating systems (UNIX and Linux for example), embedded software, and/or graphical user interfaces, may also be used. Thus, example implementations of the present disclosure are not limited to any specific combination of hardware circuitry and software.

Example implementations are not limited to computer systems. Alternative example implementations of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one example implementation.

In this illustrated example implementation, processor 1202 includes one or more execution units 1208 to implement an algorithm that is to perform at least one instruction. One example implementation may be described in the context of a single processor desktop or server system, but alternative example implementations may be included in a multiprocessor system. System 1200 is an example of a 'hub' system architecture. The computer system 1200 includes a processor 1202 to process data signals. The processor 1202, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1202 is coupled to a processor bus 1210 that transmits data signals between the processor 1202 and other components in the system 1200. The elements of system 1200 (e.g. graphics accelerator 1212, memory controller hub 1216, memory 1220, I/O controller hub 1224, wireless transceiver 1226, Flash BIOS 1228, Network controller 1234, Audio controller 1236, Serial expansion port 1238, I/O controller 1240, etc.) perform their conventional functions that are well known to those familiar with the art.

In one example implementation, the processor 1202 includes a Level 1 (L1) internal cache memory 1204. Depending on the architecture, the processor 1202 may have a single internal cache or multiple levels of internal caches. Other example implementations include a combination of both internal and external caches depending on the particular implementation and needs. Register file 1206 is to store different types of data in various registers including integer registers, floating point registers, vector registers, banked registers, shadow registers, checkpoint registers, status registers, and instruction pointer register.

Execution unit 1208, including logic to perform integer and floating point operations, also resides in the processor 1202. The processor 1202, in one example implementation, includes a microcode (ucode) ROM to store microcode, which when executed, is to perform algorithms for certain macroinstructions or handle complex scenarios. Here, microcode is potentially updateable to handle logic bugs/fixes for processor 1202. For one example implementation, execution unit 1208 includes logic to handle a packed instruction set 1209. By including the packed instruction set 1209 in the instruction set of a general-purpose processor 1202, along with associated circuitry to execute the instructions, the operations used by many multimedia applications may be performed using packed data in a general-purpose processor 1202. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate example implementations of an execution unit 1208 may also be used in micro controllers, embedded processors, graphics devices, DSPs, and other types of logic circuits. System 1200 includes a memory 1220. Memory 1220 includes a dynamic random access memory (DRAM) device, a static random access memory (SRAM) device, flash memory device, or other memory device. Memory 1220 stores instructions and/or data represented by data signals that are to be executed by the processor 1202.

A system logic chip 1216 is coupled to the processor bus 1210 and memory 1220. The system logic chip 1216 in the illustrated example implementation is a memory controller hub (MCH). The processor 1202 can communicate to the MCH 1216 via a processor bus 1210. The MCH 1216 provides a high bandwidth memory path 1218 to memory 1220 for instruction and data storage and for storage of graphics commands, data and textures. The MCH 1216 is to direct data signals between the processor 1202, memory 1220, and other components in the system 1200 and to bridge the data signals between processor bus 1210, memory 1220, and system I/O 1222. In some example implementations, the system logic chip 1216 can provide a graphics port for coupling to a graphics controller 1212. The MCH 1216 is coupled to memory 1220 through a memory interface 1218. The graphics card 1212 is coupled to the MCH 1216 through an Accelerated Graphics Port (AGP) interconnect 1214.

System 1200 uses a proprietary hub interface bus 1222 to couple the MCH 1216 to the I/O controller hub (ICH) 1230. The ICH 1230 provides direct connections to some I/O devices via a local I/O bus. The local I/O bus is a high-speed I/O bus for connecting peripherals to the memory 1220, chipset, and processor 1202. Some examples are the audio controller, firmware hub (flash BIOS) 1228, wireless transceiver 1226, data storage 1224, legacy I/O controller containing user input and keyboard interfaces, a serial expansion port such as Universal Serial Bus (USB), and a network controller 1234. The data storage device 1224 can comprise a hard disk drive, a floppy disk drive, a CD-ROM device, a flash memory device, or other mass storage device.

For another example implementation of a system, an instruction in accordance with one example implementation can be used with a system on a chip. One example implementation of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

Figure 13:
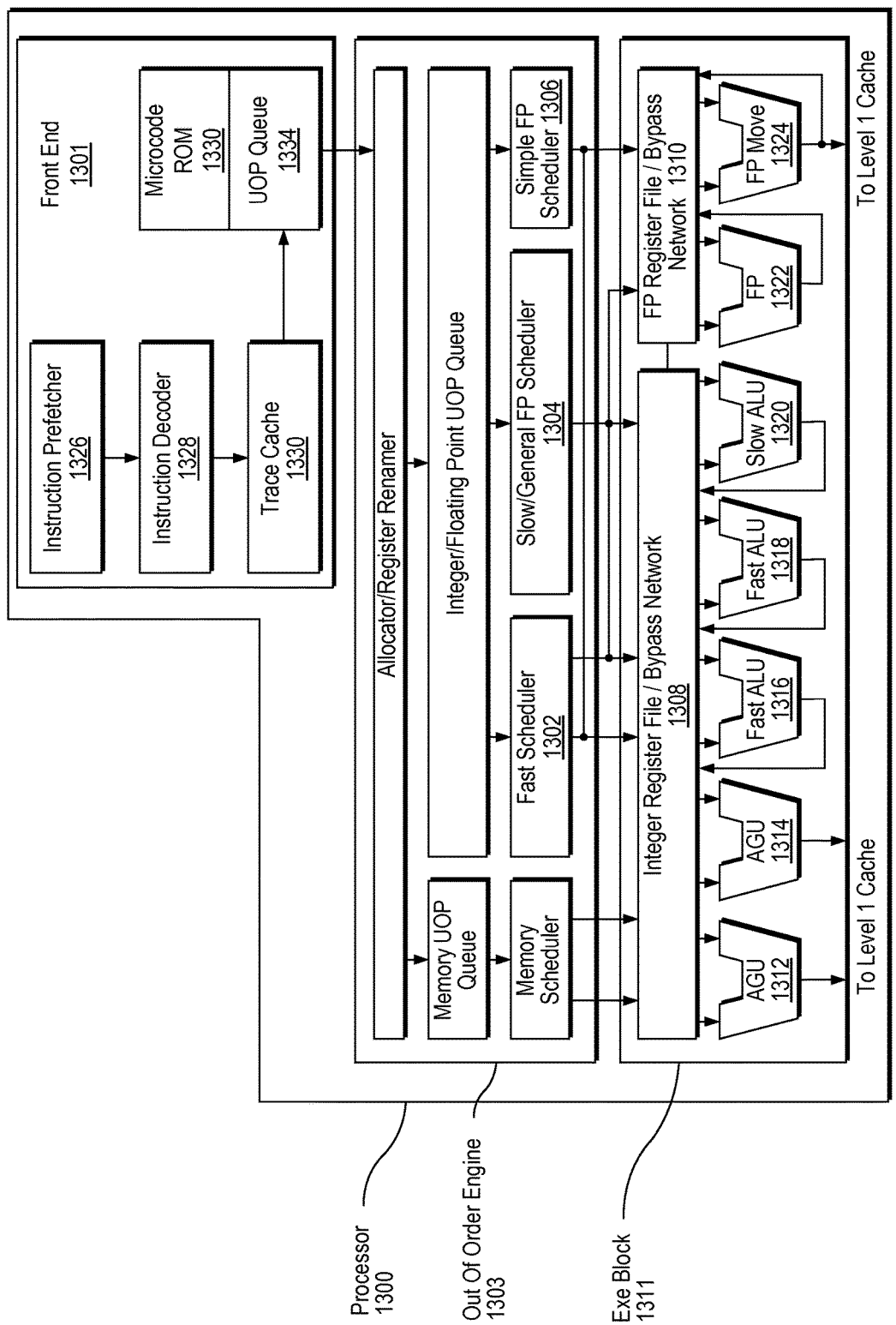
FIG. 13 schematically illustrates a block diagram of a processor according to one embodiment.

FIG. 13 is a block diagram of the micro-architecture for a processor 1300 that includes logic circuits to perform instructions in accordance with one example implementation of the present disclosure. In some example implementations, an instruction in accordance with one example implementation can be implemented to operate on data elements having sizes of byte, word, doubleword, quadword, etc., as well as datatypes, such as single and double precision integer and floating point datatypes. In one example implementation the in-order front end 1301 is the part of the processor 1300 that fetches instructions to be executed and prepares them to be used later in the processor pipeline. The front end 1301 may include several units. In one example implementation, the instruction prefetcher 1326 fetches instructions from memory and feeds them to an instruction decoder 1328 which in turn decodes or interprets them. For example, in one example implementation, the decoder decodes a received instruction into one or more operations called "micro-instructions" or "micro-operations" (also called micro op or uops) that the machine can execute. In other example implementations, the decoder parses the instruction into an opcode and corresponding data and control fields that are used by the micro-architecture to perform operations in accordance with one example implementation. In one example implementation, the trace cache 1330 takes decoded uops and assembles them into program ordered sequences or traces in the uop queue 1334 for execution. When the trace cache 1330 encounters a complex instruction, the microcode ROM 1332 provides the uops needed to complete the operation.

Some instructions are converted into a single micro-op, whereas others need several micro-ops to complete the full operation. In one example implementation, if more than four micro-ops are needed to complete an instruction, the decoder 1328 accesses the microcode ROM 1332 to do the instruction. For one example implementation, an instruction can be decoded into a small number of micro ops for processing at the instruction decoder 1328. In another example implementation, an instruction can be stored within the microcode ROM 1332 should a number of micro-ops be needed to accomplish the operation. The trace cache 1330 refers to an entry point programmable logic array (PLA) to determine a correct micro-instruction pointer for reading the micro-code sequences to complete one or more instructions in accordance with one example implementation from the microcode ROM 1332. After the microcode ROM 1332 finishes sequencing micro-ops for an instruction, the front end 1301 of the machine resumes fetching micro-ops from the trace cache 1330.

The out-of-order execution engine 1303 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 1302, slow/general floating point scheduler 1304, and simple floating point scheduler 1306. The uop schedulers 1302, 1304, 1306, determine when a uop is ready to execute based on the readiness of their dependent input register operand sources and the availability of the execution resources the uops need to complete their operation. The fast scheduler 1302 of one example implementation can schedule on each half of the main clock cycle while the other schedulers can only schedule once per main processor clock cycle. The schedulers arbitrate for the dispatch ports to schedule uops for execution.

Register files 1308, 1310, sit between the schedulers 1302, 1304, 1306, and the execution units 1312, 1314, 1316, 1318, 1320, 1322, and 1324 in the execution block 1311. There is a separate register file 1308, 1310, for integer and floating point operations, respectively. Each register file 1308, 1310, of one example implementation also includes a bypass network that can bypass or forward just completed results that have not yet been written into the register file to new dependent uops. The integer register file 1308 and the floating point register file 1310 are also capable of communicating data with the other. For one example implementation, the integer register file 1308 is split into two separate register files, one register file for the low order 32 bits of data and a second register file for the high order 32 bits of data. The floating point register file 1310 of one example implementation has 128 bit wide entries because floating point instructions typically have operands from 64 to 128 bits in width.

The execution block 1311 contains the execution units 1312, 1314, 1316, 1318, 1320, 1322, 1324, where the instructions are actually executed. This section includes the register files 1308, 1310, that store the integer and floating point data operand values that the micro-instructions need to execute. The processor 1300 of one example implementation is comprised of a number of execution units: address generation unit (AGU) 1312, AGU 1314, fast ALU 1316, fast ALU 1318, slow ALU 1320, floating point ALU 1322, floating point move unit 1324. For one example implementation, the floating point execution blocks 1322, 1324, execute floating point, MMX, SIMD, and SSE, or other operations. The floating point ALU 1322 of one example implementation includes a 64 bit by 64 bit floating point divider to execute divide, square root, and remainder microops. For example implementations of the present disclosure, instructions involving a floating point value may be handled with the floating point hardware. In one example implementation, the ALU operations go to the high-speed ALU execution units 1316, 1318. The fast ALUs 1316, 1318, of one example implementation can execute fast operations with an effective latency of half a clock cycle. For one example implementation, most complex integer operations go to the slow ALU 1320 as the slow ALU 1320 includes integer execution hardware for long latency type of operations, such as a multiplier, shifts, flag logic, and branch processing. Memory load/store operations are executed by the AGUs 1312, 1314. For one example implementation, the integer ALUs 1316, 1318, 1320, are described in the context of performing integer operations on 64 bit data operands. In alternative example implementations, the ALUs 1316, 1318, 1320, can be implemented to support a variety of data bits including 16, 32, 128, 256, etc. Similarly, the floating point units 1322, 1324, can be implemented to support a range of operands having bits of various widths. For one example implementation, the floating point units 1322, 1324, can operate on 128 bits wide packed data operands in conjunction with SIMD and multimedia instructions.

In one example implementation, the uops schedulers 1302, 1304, 1306, dispatch dependent operations before the parent load has finished executing. As uops are speculatively scheduled and executed in processor 1300, the processor 1300 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one example implementation of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an example implementation should not be limited in meaning to a particular type of circuit. Rather, a register of an example implementation is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one example implementation, integer registers store thirty-two bit integer data. A register file of one example implementation also contains eight multimedia SIMD registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one example implementation, in storing packed data and integer data, the registers do not need to differentiate between the two data types. In one example implementation, integer and floating point are either contained in the same register file or different register files. Furthermore, in one example implementation, floating point and integer data may be stored in different registers or the same registers.

In accordance with one or more aspects of the present disclosure, a processing system, such as processing system 1300 of FIG. 13, may comprise one or more processing core coupled to an architecturally protected memory. In certain implementations, the processing system may implement Software Guard Extensions (SGX), which is a set of extensions of Intel® architecture that allow an application to instantiate a protected container, referred to as an enclave.

Figure 14:
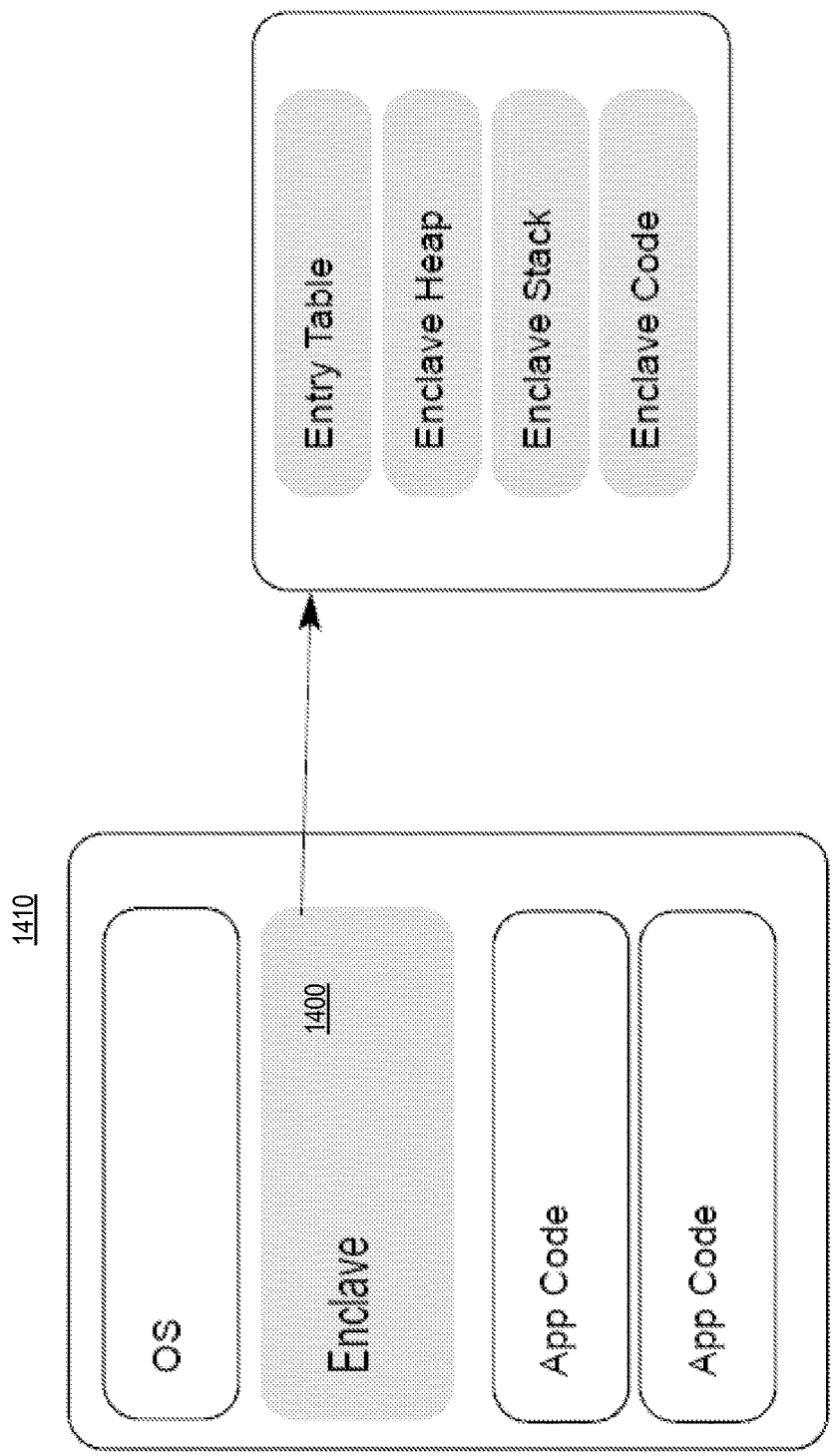
FIG. 14 schematically illustrates a block diagram of an application memory space, according to one embodiment.

As schematically illustrated by FIG. 14, an enclave 1400 is a protected area in the application's address space 1410. Enclave 1400 provides confidentiality and integrity even in the presence of privileged malware. Attempted accesses to the enclave memory area from software not resident in the enclave are prevented even from privileged software such as virtual machine monitors, BIOS, or operating systems. SGX allows the protected portion of an application to be distributed in the clear. Before the enclave is built the enclave code and data is free for inspection and analysis. The protected portion is loaded into an enclave where its code and data is measured. Once the application's code and data is loaded into an enclave, it is protected against all external software access. An application can prove its identity to a remote party and be securely provisioned with keys and credentials. The application can also request an enclave & platform specific key that it can use to protect keys and data that it wishes to store outside the enclave, as described in more details herein below.

SGX prevents all other software from accessing the code and data located inside an enclave, including system software and access from other enclaves. Attempts to modify an enclave's contents are detected and either prevented or execution is aborted. A summary of security properties are:

SGX provides detection of an integrity violation of an enclave instance from software attacks and prevents access to tampered code/data upon detection;

SGX provides confidentiality of code/data of an enclave instance from software attacks;

SGX provides isolation between all enclave instances; and

SGX prevents replay of an enclave instance from software attacks.

In addition, the hardware ensures execution starts only at enclave authorized locations and that unplanned exits from the enclave do not leak enclave information. Finally, data inside an enclave is protected from tampering from all software outside the enclave's trust boundary, even when the enclave is sent to disk or unprotected memory by the OS or VMM managing the system resources.

Thus, the code executing inside an enclave is able to access code and data internal to the enclave while access from outside the enclave is prohibited. Also, the translation from the application's virtual address to the correct physical address is kept the same as when the application developer built the applicationl. While enclave data is resident within registers, caches, or other logic blocks within the processor package, unauthorized access via software is prevented using access control mechanisms built into the processor. However, when enclave data leaves the package caches to be written to the platform memory, the data is automatically encrypted and integrity protected preventing memory probes or other techniques to view, modify, or replay data or code contained within an enclave.

Figure 15:
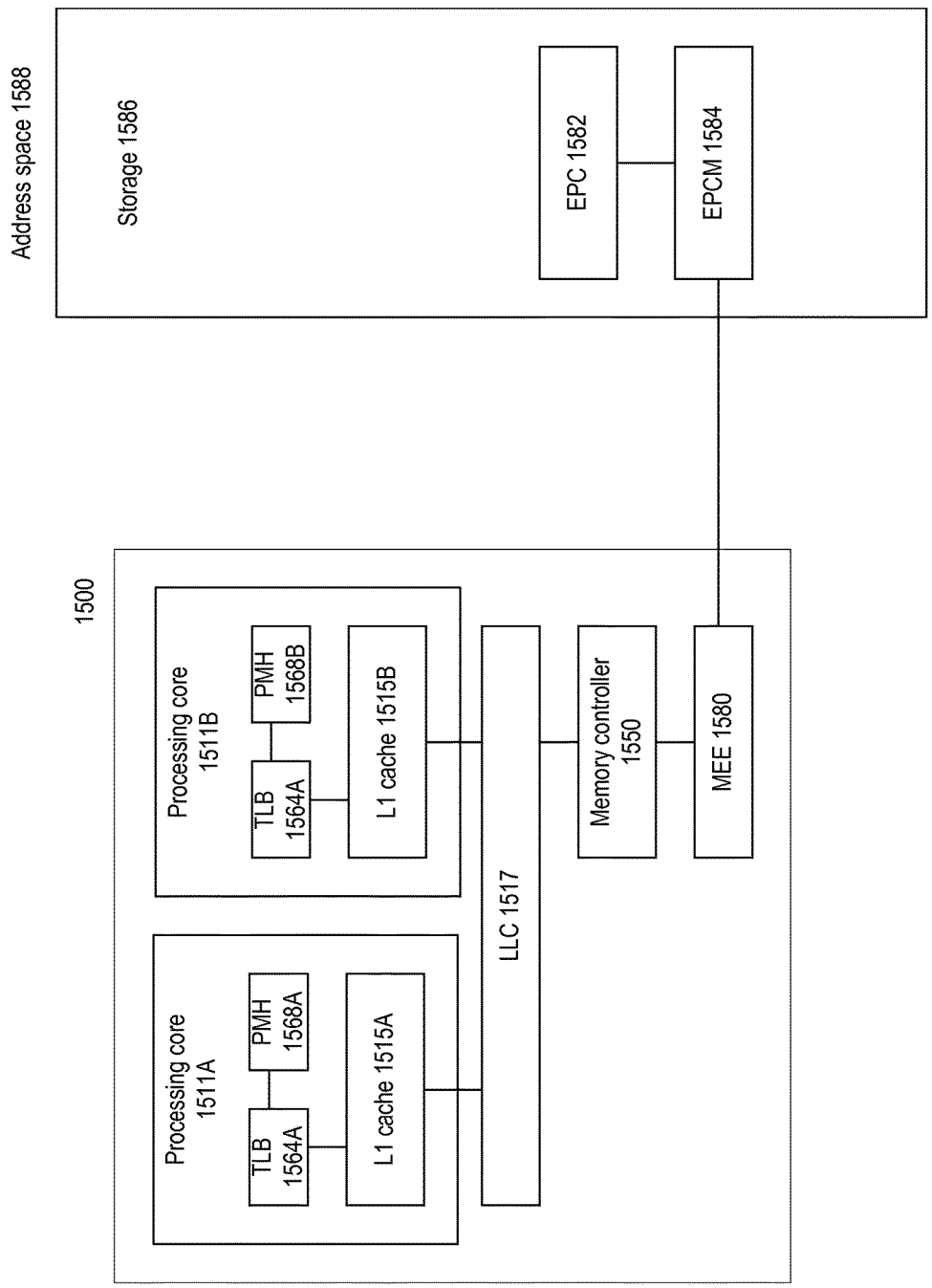
FIG. 15 schematically illustrates a block diagram of an example processing system operating in according to one embodiment.

Referring now to FIG. 15, shown is a block diagram of an example processing system in accordance with one or more aspects of the present disclosure. As shown in FIG. 15, processing system 1500 may include one or more processing cores 1511, each processing core 1511 having a local first level (L1) cache 1515 associated therewith. L1 cache 1515 may be communicatively coupled to a shared last level cache (LLC) 1517. In an illustrative example, the cache hierarchy comprising L1 cache 1515 and LLC 1517 may be configured as an inclusive cache hierarchy, such that at least part of the information stored in L1 cache 1515 may also be stored in LLC 1517.

In accordance with one or more aspects of the present disclosure, processing system 1500 may comprise an architecturally protected memory. Processing core 1511 may comprise processing logic configured to implement a secure enclave by executing instructions residing in the protected memory and accessing data residing in the protected memory, while preventing unauthorized access to the protected memory even by privileged applications, as described in more details herein below.

An active secure enclave may be divided into an encrypted portion and a decrypted portion. The encrypted portion may reside in an unprotected memory (such as main memory or disk). The decrypted portion resides in the enclave page cache (EPC) 1582. The EPC is a protected memory used by the processing system to temporarily store enclave pages when they are not cryptographically protected.

A processing system that supports SGX and implements EPC in a cryptographically protected platform memory supports the ability for the BIOS to reserve a range(s) of memory called Processor Reserved Memory (PRM). The BIOS allocates the PRM by configuring a set of range registers, collectively known as the PRMRR. The EPC is allocated within the PRM. CPU memory protection mechanisms physically block access to PRM from all external agents (DMA, graphic engine, etc.), by treating such accesses as references to non-existent memory.

The EPC may be divided into pages of a pre-defined size, which may be referred to as EPC pages. The EPC is protected from any accesses by software residing outside the enclave. Furthermore, unauthorized parties will not be able to read or modify plain-text data belonging to enclaves that is loaded into the EPC via straight-forward hardware attacks. The EPC is located within the physical address space of the processing system, but can only be accessed using privileged or non-privileged enclave instructions used to build and enable an enclave, enter/exit the enclave, manage EPC, and perform various other operations.

There are several mechanisms of implementing the EPC. The EPC may be implemented as on on-die static random access memory (SRAM) or dynamic random access memory (DRAM). Alternatively, the EPC may be constructed by sequestering ways of the CPU's last-level cache. Another mechanism of implementing EPC is the Memory Encryption Engine (MEE). MEE herein shall refer to a hardware-implemented processing logic that encrypts the traffic between the processor package and the platform DRAM, thus providing a mechanism of creating a cryptographically protected volatile storage using the platform DRAM. MEE may intercept attempted memory accesses and route those accesses to a cryptographic controller, which may generate one or more memory accesses to the platform DRAM to fetch the cipher-text, processes the cipher-text to generate the plain-text, and satisfy the original memory access request.

Referring again to FIG. 15, L1 cache 1515 can transfer data to and from the LLC 1520. Memory controller 1550 can be connected to the last level cache 1520 and to MEE 1580. Memory controller 1550 can assess EPC 1582 residing on backing storage device 1586 within physical address space 1588.

The Enclave Page Cache Map (EPCM) 1544 is a protected structure employed by the processing system to track the contents of the EPC. EPCM 1584 may comprise a plurality of entries with each entry corresponding to a page in the EPC. Each EPCM entry may hold, in an implementation-dependent format, the following information: whether the EPC page is valid or invalid; an identifier of the enclave instance that owns the page; the type of the page (REG, TCS, VA, SECS); the virtual address through which the enclave is allowed to access the page; read/write/execute permissions for the page; whether the page is accessible or not (BLOCKED or UNBLOCKED).

EPCM 1584 may be used by the processing system in the address translation flow to enforce access-control on the enclave pages loaded into the EPC. Logically it provides an additional secure layer of access control in addition to "legacy" segmentation, paging tables and extended paging tables mechanisms.

The EPC, EPCM, and various other implementation-specific data structures may be mapped to locations inside the architecturally protected memory. When a request to access the EPC is generated, processing system 1500 may remap the request to the backing storage location containing encrypted EPC data, and retrieve the data.

Various enclave-related functions may be implemented in the microcode, supported by the hardware implementations of MEE and the processing logic implementing the enclave functionality. In certain implementations, the processing logic may control access to EPC 1582 via a translation lookaside buffer (TLB) 1564 and a page miss handler (PMH) 1568.

In an illustrative example, a TLB may be implemented as a table mapping virtual addresses to physical addresses. "TLB hit" refers to a situation when a requested virtual address is present in the TLB. "TLB miss" refers to the opposite situation: when the requested virtual address is not present in the TLB, the address translation may proceed by looking up the page table. After the physical address is determined, the virtual address to physical address mapping may be entered into the TLB.

Each TLB entry may include one or more bits indicating identifying the enclave owning the memory location referenced by the TLB entry. Alternatively, if these bits are not provided, a TLB flush will be needed when exiting the secure enclave to prevent unauthorized access to the EPC. In an illustrative example, if a TLB miss occurs, an extra lookup may fetch data from the EPC map on multiple memory references. The PMH may perform the look up of the EPC map.

Figure 16:
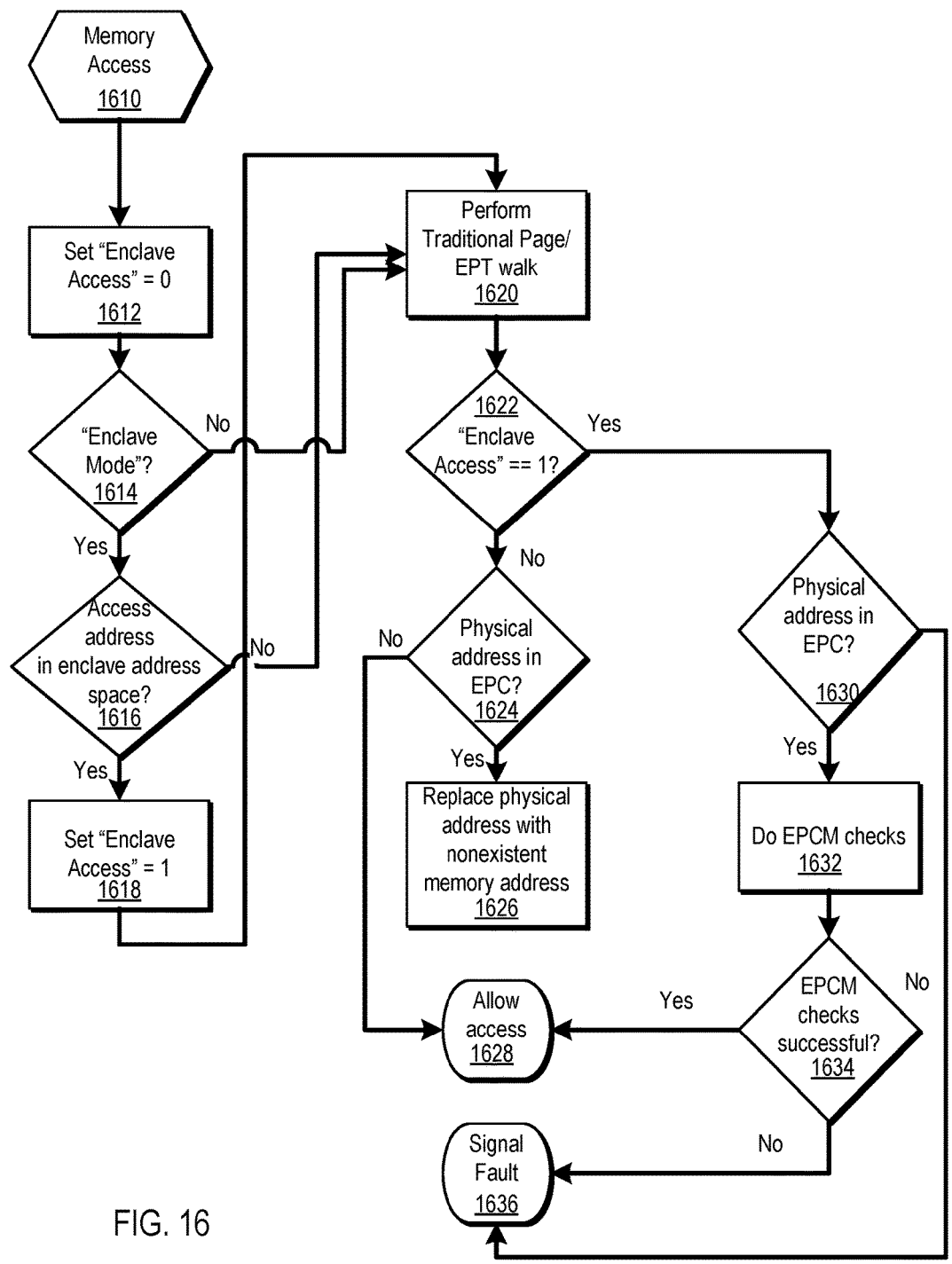
FIG. 16 schematically illustrates hardware-implemented checks that are performed when a page inside enclave is accessed according to one embodiment.

FIG. 16 schematically illustrates hardware-implemented checks that are performed when a page inside enclave is accessed (e.g., using MOV or other memory access instructions). These hardware-implemented checks may include: ascertaining that the logical processor is executing in "enclave mode" (block 1614); ascertaining that page belongs to enclave that the logical processor is executing (block 1616); and ascertaining that the page has been accessed using the correct virtual address (block 1624).

If the accessed page is not part of the enclave's virtual address space but is part of the EPC then the access is treated as a reference to nonexistent memory (block 1626). If the page is outside of the enclave virtual address space (block 1624), then hardware allows the enclave code to access the memory outside of PRM (block 1628). If the page is outside of the enclave's virtual address space and resolves into a PRM page, hardware prevents such access by signaling a fault (block 1636). Accesses by a processor not in enclave mode to an enclave page are treated as a reference to nonexistent memory (block 1626).

In an illustrative example, the enclave creation process begins by executing ECREATE instruction, which converts a free EPC page into a Secure Enclave Control Structure (SECS) page and initializes the control structure. As part of ECREATE instruction, the system software selects the EPC page to be made a SECS page and specifies several attributes of the enclave including the range of protected addresses the enclave can access, the mode of operation (32 bit vs 64 bit), processor features supported by the enclave, and whether debug access is allowed.

Once the SECS has been created, enclave pages can be added to the enclave by executing EADD instruction. This involves converting a free EPC page into either a REG or a Thread Control Structure (TCS). EADD instruction, when invoked, will initialize the EPCM entry to indicate the type of page (REG or TCS), the linear address by which the enclave will access the page, the enclave RWX permissions for the page, and will associate the page to the SECS provided as input. The EPCM entry information is used by the hardware to provide SGX access control to the page. EADD instruction will then record the EPCM information in a cryptographic log stored in the SECS and copy 4 K bytes of data from an unprotected memory to the allocated EPC page.

The system software is responsible for selecting a free EPC page, the type of page to be added, the attributes the page, the contents of the page, and the SECS (enclave) to which the page is to be added.

After a page has been added to an enclave, software can measure a 256 byte region as determined by the software by invoking EEXTEND instruction. Thus, to measure an entire page, the system software should execute EEXTEND 16 times. Each invocation of EEXTEND instruction adds to the cryptographic log, a header indicating which region is being measured followed by the 256 bytes of information.

Entries in the cryptographic log define the measurement of the enclave and are important in gaining the assurance that the enclave was correctly constructed by the untrusted system software. Correct construction results in the cryptographic log matching the one built by the enclave owner in SIGSTRUCT. It can be verified by the remote party.

Once system software has completed the process of adding and measuring pages, the enclave may be initialized. Initializing an enclave prevents the addition and measurement of enclave pages and enables enclave entry. The initialization process finalizes the cryptographic log and establishes the enclave identity and sealing identity used by EGETKEY and EREPORT.

The sealing identity is managed by a sealing authority represented by the hash of a public key used to sign a structure processed by EINIT. The sealing authority assigns a product ID and security version number to a particular enclave identity comprising the attributes of the enclave and the measurement of the enclave.

To establish the sealing identity, EINIT may verify that SIGSTRUCT is signed using the public key enclosed in the SIGSTRUCT; ascertain that measurement of the enclave matches the measurement of the enclave specified in SIGSTRUCT; ascertain that the enclave's attributes are compatible with those specified in SIGSTRUCT; and finalize the measurement of the enclave and records the sealing identity and enclave identity (the sealing authority, product id and security version number) in the SECS. If EINIT instruction was successful, it enables the enclave to be entered.

Controlling transfer of execution into and out of an enclave is of a paramount importance for preserving the enclave integrity. The entry process may clear any cached translations that overlap with the enclave's protected address region. This ensures that all protected enclave memory accesses are properly checked. The entry process should identify where inside the enclave the processor should transfer control and enable enclave mode of execution. Exiting an enclave should again clear any cached translations referring to the enclave's protected address region so that no other software can use the cached translations to access the enclave's protected memory.

While a processor is operating in enclave mode, an interrupt, fault or exception may occur. Traditionally, the processor would vector to a fault handler specified by system software. The fault handler saves the register state and services the event. Once the event has been serviced, the system software restores the register state and returns control to where software was interrupted. Allowing the system software to read and/or modify the register state of an enclave places system software within the trust boundary of the enclave.

In certain implementations, the processing system may support EENTER and EEXIT instructions to enter and exit an enclave programmatically (e.g. as part of call/return sequence). When enclave exit occurs due to an event, the processor invokes a special internal routine called Asynchronous Exit (AEX) which saves the enclave register state, clears the registers, sets the faulting instruction address to a value specified by EENTER. ERESUME instruction restores the state back to allow the enclave to resume execution.

Allowing the system software to oversubscribe the EPC increases the number of protected applications that can be supported concurrently. In certain implementations, the processing system may support instructions to allow system software to oversubscribe the EPC by securely evicting and loading enclave pages and SGX structures. The contents of an enclave page evicted from the EPC to main memory should have the same level of integrity, confidentiality and replay protection as when the contents resided within the EPC.

To achieve this objective, the paging instructions may enforce one or more of the following rules: an enclave page may be evicted only after all cached translations to that page have been evicted from all logical processors; the contents of the evicted enclave page should be encrypted before being written out to main memory; when an evicted enclave page is reloaded into EPC, it should have the identical page type, permissions, virtual address, content, and be associated to the same enclave as at the time of eviction; and only the last evicted version of an enclave page can be allowed to be reloaded To prepare the enclave page for eviction, system software marks the page to be evicted as BLOCKED using the EBLOCK instruction. Once an EPC page has been marked as BLOCKED, the processor prevents any new Translation Lookaside Buffer, TLB, entries that map that EPC page from being created. However, TLB entries that reference this page may exist in one or more logical processors. These TLB entries should be removed before the page can be removed from the EPC. In SGX this should be guaranteed by hardware. While only the TLB entries for the page should be removed, we chose a simpler implementation option. In this implementation all TLB entries for that particular enclave are removed.

TLB entries created during enclave execution are evicted when exiting the enclave. Thus an enclave page that is BLOCKED can be safely evicted after all logical processors that were executing inside the enclave to which the page belongs have exited the enclave at least once since the EBLOCK.

ETRACK instruction is used to configure micro-architectural trackers to detect when all logical processors executing in an enclave at the time of executing ETRACK instruction have exited the enclave.

The system software may use a dedicated instruction (e.g., EWB) to evict an enclave page that has been prepared for eviction (blocked and no TLB entries referring to the page). The system software should also allocate a version array (VA) page entry to hold the version counter to be associated with this page. A processor executing EWB instruction evicts a page from EPC by performing the following operations: assigning a unique version value for the page and recording it in the VA page entry allocated by the system software; encrypting the EPC page using the paging encryption key; computing a cryptographic MAC over the encrypted page contents, version counter and the additional metadata for the EPC page; and writing out the encrypted page contents and the metadata along with the computed MAC to the main memory buffers passed to the EWB instruction as parameters.

The system software should retain the encrypted page contents, the metadata and the VA entry with this EPC page in order to reload it back into EPC.

The system software may use a dedicated instruction (e.g., ELDU or ELDB) to reload an evicted enclave page into the EPC. The system software allocates a free page in the EPC and passes the encrypted page contents, the metadata generated at eviction and the VA entry used to evict the page as parameters to the ELDU/ELDB instructions. ELDU and ELDB instructions are identical except that on successful execution of the ELDB instruction the EPC page used to reload the enclave page is marked as BLOCKED in the EPCM. A processor executing ELDU/ELDB instructions reloads the enclave page by performing the following operations: copying the encrypted enclave page contents to the allocated EPC page; verifying the MAC on the metadata, version counter from the specified VA entry and encrypted enclave page contents; if the verification succeeds, decrypting the enclave page contents into the EPC page allocated by system software and clear the VA entry to prevent any future replay attempts; and updating the EPCM associated with the EPC page with the attributes from the metadata.

A processing system operating in accordance with one or more aspects of the present disclosure may implement a mechanism, referred to as "attestation," by which the processing system may demonstrate to an external entity (e.g., a remote computer system) that a software module has been properly instantiated on the processing system. In certain implementations, the processing system may produce an identity key identifying the hardware platform. In an illustrative example, an application executed within an enclave may provide the identity key to a certification service. Upon validating the identity key, the certification service may issue an attestation key, and may further transmit the attestation key to a provisioning service. A secure enclave application executed by the processing system may then transmit its identity key to the provisioning service in order to retrieve security-sensitive data.

Each processor may be provisioned with an identity key during the manufacturing process. The processor identity key may be stored in a non-volatile read-only memory comprised by the processor, such as a set of programmable fuses. For single-processor platforms, the processor's identity key may be employed as the platform identity key to be provided to a certification service, and may also be employed as the keying material to produce one or more encryption keys to be used for secure enclave creation. In certain implementations, each secure enclave may request one or more keys using EGETKEY instruction.

Figure 17:
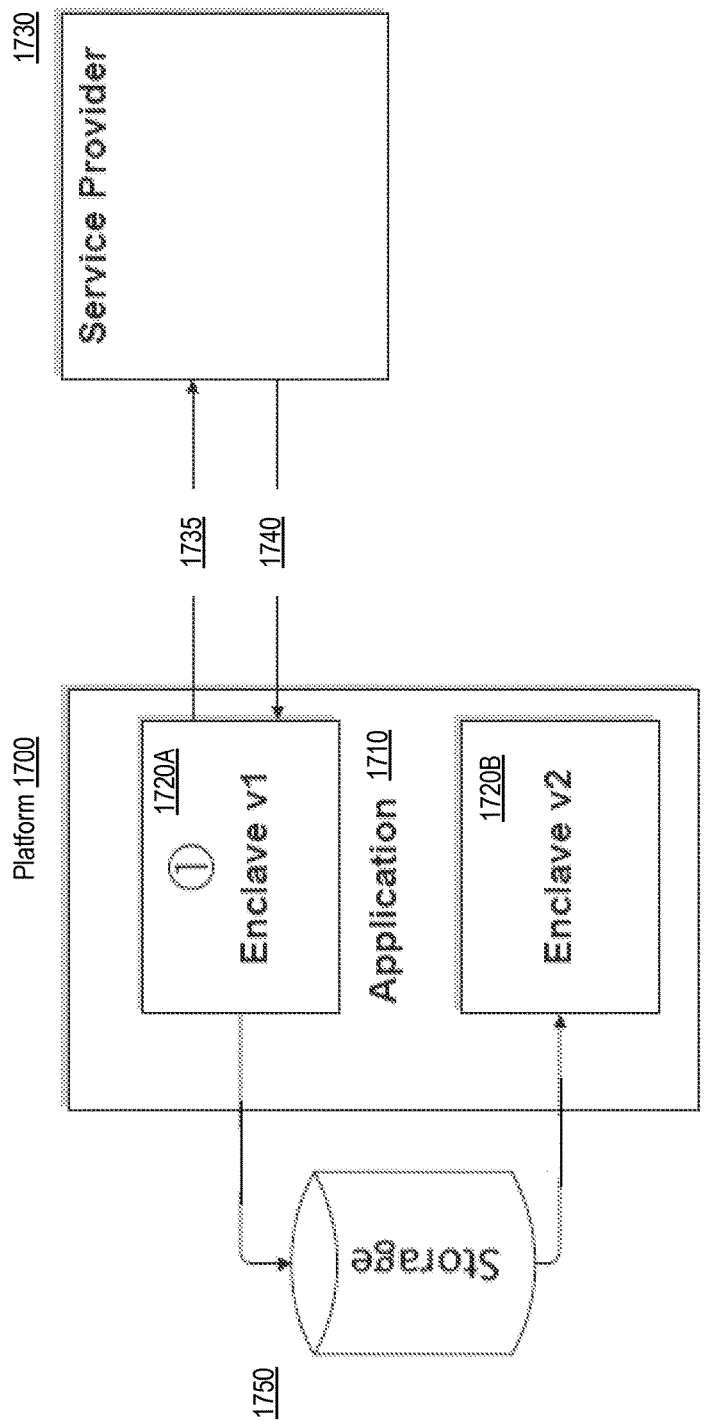
FIG. 17 schematically illustrates an example method of software provisioning by a computer system operating according to one embodiment.

FIG. 17 schematically illustrates an example method for software provisioning by a computer system operating in accordance with one or more aspects of the present disclosure. In certain implementations, after an untrusted application 1710 is installed, it may contact a service provider to have data remotely provisioned to the enclave. The software then encrypts the data and stores it for future use. As schematically illustrated by FIG. 17, the example method starts by application 1710 launching a trusted execution environment (TEE) 1720A. While enclave 1720A is being created, a secure log is recorded reflecting the contents of the enclave and how it was loaded. This secure log is the enclave's "measurement."

Enclave 1720A may contact a service provider 1730 over a communication channel 1735 to request sensitive data to be provisioned to the enclave. Platform 1700 produces "attestation", which is a secure assertion that identifies the hardware environment and the enclave.

Service provider 1730 uses the attestation to establish secure communication and provision sensitive data to enclave 1720A. Using a secure channel 1740, the service provider sends the data to the enclave.

Enclave 1720B uses a persistent hardware-based encryption key to securely encrypt and store, in data storage 1750, its sensitive data in a way that ensures the data can be retrieved only when the trusted environment is restored. The data encryption/decryption process is also referred to as "sealing/unsealing."

Enclave software updates may be required by the service provider. To streamline the migration of data from an older software version to the newer version, the software can request seal keys from older versions to unseal the data and request the new version's seal so that the sealed data won't be available to previous versions of the software.

In certain implementations, a processing system operating in accordance with one or more aspects of the present disclosure, may support certain instructions (EREPORT and EGETKEY) to perform attestation and sealing. EREPORT instruction provides an evidence structure that is cryptographically bound to the hardware for consumption by attestation verifiers. EGETKEY instruction provides enclave software with access to the "Report" and "Seal" keys used in the attestation and sealing process.

The processing system may further provide two measurement registers for each enclave, referred to as MRENCLAVE and MRSIGNER. MRENCLAVE register provides an identity of the enclave code and data as it's constructed and MRSIGNER register provides an identity of an authority over the enclave. These values are recorded while the enclave is built, and are finalized before enclave execution commences. Only the trusted computing base (TCB) has access to write to these registers in order to ensure an accurate reflection of the identities is available when attesting and sealing.

The "Enclave Identity" is the value of MRENCLAVE register, which is a cryptographic (e.g., SHA-256) digest of an internal log that records all the activity done while the enclave is built. The log may comprise the following information: the contents of the pages (code, data, stack, heap); the relative position of the pages in the enclave; and/or any security flags associated with the pages.

Once enclave initialization is complete, through the EINIT instruction, no more updates are made to MRENCLAVE. The final value of MRENCLAVE is a cryptographic digest that identifies the code, data, and stack placed inside the enclave, the order and position in which the enclave's pages were placed, and the security properties of each page. Any change to any of these variables would lead to a different value in MRENCLAVE.

The enclave has a second identity used for data protection called the "Sealing Identity." The Sealing Identity includes a "Sealing Authority," a product ID and a version number.

The Sealing Authority is an entity that signs the enclave prior to distribution, typically the enclave builder. The enclave builder presents the hardware with a cryptographically signed enclave certificate (SIGSTRUCT) that contains the expected value of the Enclave Identity, MRENCLAVE, and the public key of the Sealing Authority. The hardware checks the signature on the certificate, using the public key contained within, and then it compares the value of the measured MRENCLAVE against the signed version. If these checks pass, a hash of the public key of the Sealing Authority is stored in the MRSIGNER register. Multiple enclaves are signed by the same Sealing Authority would all have the same MRSIGNER value. The value of Sealing Identity can be used for sealing data in a way that enclaves from the same Sealing Authority (e.g., different versions of the same enclave) can share and migrate their sealed data.

Figure 18:
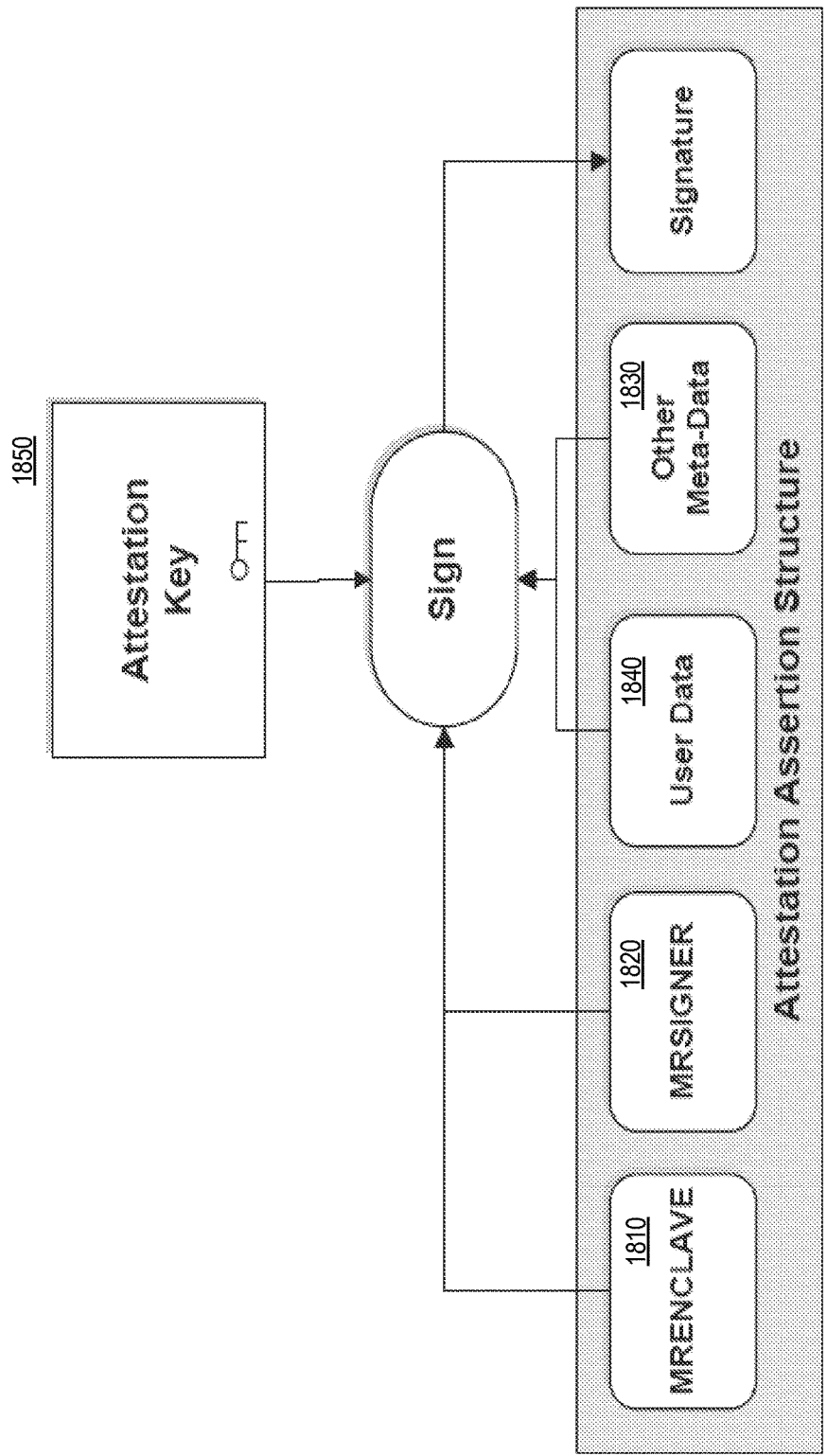
FIG. 18 schematically illustrates an example method of providing an attestation by a computer system operating according to one embodiment.

Attestation is the process of demonstrating that a piece of software has been properly instantiated on the platform. As schematically illustrated by FIG. 18, a processing system operating in accordance with one or more aspects of the present disclosure may provide an attestation assertion that conveys the following information: the identities 1810, 1820 of the software environment being attested; data 1830 representing details of any non-measureable state (e.g. the mode the software environment may be running in); data 1840 associated with the software environment; and attestation key 1850 representing a cryptographic binding to the platform TCB making the assertion.

In an illustrative example, an application may comprise two enclaves which can cooperate with one another to perform some higher-level function. A processing system operating in accordance with one or more aspects of the present disclosure may support a certain instruction (e.g., EREPORT) to enable the co-operating enclaves to authenticate each other.

When invoked by an enclave, EREPORT instruction creates a signed structure, known as a REPORT. The REPORT structure contains the two identities of the enclave, the attributes associated with the enclave (attributes identify modes and other properties established during ECREATE), the trustworthiness of the hardware TCB, and additional information the enclave developer wishes to pass on to the target enclave, and a message authentication code (MAC) tag. The target enclave is the enclave which will verify the MAC over the REPORT allowing it to determine that the enclave that created the REPORT has run on the same platform. The MAC is produced with a key called the "Report Key".

The Report Key is known only to the target enclave and to the EREPORT instruction. The validating (target) enclave can retrieve its own Report Key using the EGETKEY instruction. EGETKEY provides enclaves with keys, among them the Report Key, usable for symmetric encryption and authentication. The target enclave uses the Report Key to re-compute the MAC over the REPORT data structure, and verify that the REPORT was produced by the attesting (reporting) enclave.

Each REPORT structure also includes a 256-bit field for User Data. This field binds data that is inside the enclave to the identity of the enclave (as expressed by the REPORT). This field can be used to extend the REPORT with auxiliary data by populating it with a hash digest of the auxiliary data, which is then provided alongside the REPORT. The use of the User Data field enables an enclave to build a higher level protocol to form a secure channel between itself and another entity. For example, by exchanging REPORTs that authenticate public Diffie-Hellman keys, that were randomly generated inside the enclave using mutually agreed parameters, the enclaves can generate an authenticated shared secret and use it to protect further communications between themselves.

Figure 19:
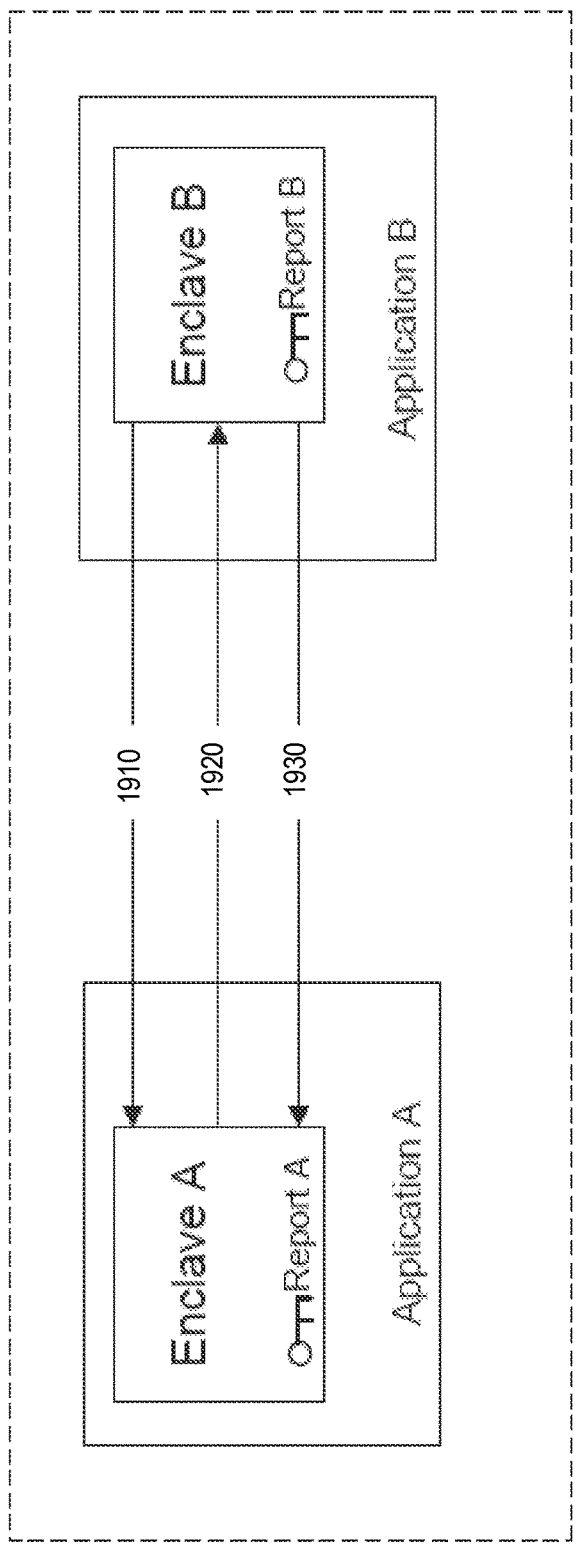
FIG. 19 schematically illustrates an example method of mutually authenticating two enclaves running on the same platform according to one embodiment.

FIG. 19 schematically illustrates an example method of mutually authenticating two enclaves running on the same platform. As schematically referenced by operation 1910, after a communication path between enclave A and B have been established, enclave A obtains enclave B's MRENCLAVE value. The communication path established in this operation doesn't have to be secure.

As schematically referenced by operation 1920, enclave A invokes the EREPORT instruction together with enclave B's MRENCLAVE to create a signed REPORT destined for enclave B. Enclave A transmits its REPORT to enclave B via the untrusted communication path.

As schematically referenced by operation 1930, after receiving the REPORT from enclave A, enclave B calls EGETKEY to retrieve its Report Key, recomputes the MAC over the REPORT structure, and compares the result with the MAC accompanying the REPORT. A match in the MAC value affirms that A is indeed an enclave that is running on the same platform as enclave B.

Once the firmware and hardware components of the TCB have been verified, Enclave B can then examine Enclave A's REPORT to verify the software components of the TCB: MRENCLAVE reflecting the contents of the software image running inside the enclave, and MRSIGNER reflecting the sealer's identity.

Enclave B may then reciprocate by creating a REPORT for enclave A, by using the MRENCLAVE value from the REPORT it just received. Enclave B may then transmit its REPORT to enclave A. Enclave A may then verify the report in a similar manner to enclave B confirming that enclave B exists on the same platform as enclave A.

The authentication mechanism used for intra-platform enclave attestation uses a symmetric key system, where only the enclave verifying the REPORT structure and the EREPORT instruction that creates the REPORT have access to the authentication key. Creating an attestation that can be verified outside the platform requires using asymmetric cryptography. In certain implementations, a processing system operating in accordance with one or more aspects of the present disclosure may implement a special enclave, called the Quoting Enclave, which is devoted to remote attestation. The Quoting Enclave verifies REPORTs from other enclaves on the platform using the Intra-platform enclave attestation method described above, and then replaces the MAC over these REPORTs with a signature created with a device specific (private) asymmetric key. The output of this process is called a QUOTE.

In certain implementations, a processing system operating in accordance with one or more aspects of the present disclosure may implement Enhanced Privacy ID (EPID) attestation scheme employing a group signature scheme that allows a platform to sign objects without uniquely identifying the platform or linking different signatures. Instead, each signer belongs to a "group", and verifiers use the group's public key to verify signatures. EPID supports two modes of signatures. In the fully anonymous mode of EPID a verifier cannot associate a given signature with a particular member of the group. In Pseudonymous mode an EPID verifier has the ability to determine whether it has verified the platform previously.

The Quoting Enclave creates the EPID key used for signing platform attestations which is then certified by an EPID backend infrastructure. The EPID key represents not only the platform but the trustworthiness of the underlying hardware. Only the Quoting Enclave has access to the EPID key when the enclave system is operational, and the EPID key is bound to the version of the processor's firmware. Therefore, a QUOTE can be seen to be issued by the processor itself.

Figure 20:
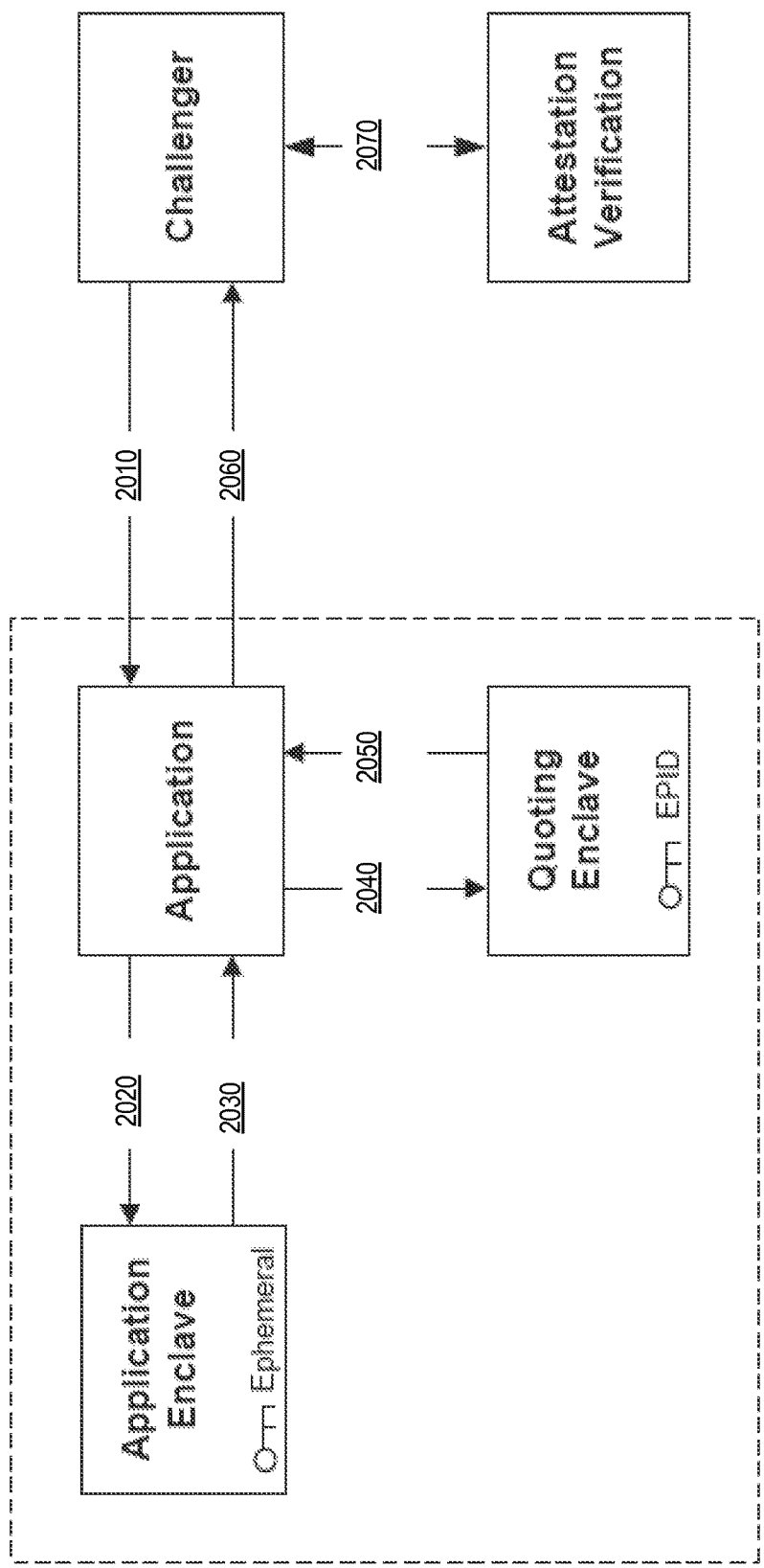
FIG. 20 schematically illustrates an example method for providing an attestation to a challenging service provider by an application being executed by a computer system operating according to one embodiment.

FIG. 20 schematically illustrates an example method for providing an attestation to a challenging service provider by an application being executed by computer system operating in accordance with one or more aspects of the present disclosure. As schematically referenced by operation 2010, an application may establish a communication channel with a service provider system. The service provider issues a challenge to the application to demonstrate that it is running the necessary components inside one or more enclaves.

As schematically referenced by operation 2020, the application is provided with the Quoting Enclave's Enclave Identity and passes it along with the provider's challenge to the application's enclave.

As schematically referenced by operation 2030, the enclave generates a manifest that includes a response to the challenge and an ephemerally generated public key to be used by the challenger for communicating secrets back to the enclave. It then generates a hash digest of the manifest and includes it as User Data for the EREPORT instruction that will generate a REPORT that binds the manifest to the enclave. The enclave then sends the REPORT to the application.

As schematically referenced by operation 2040, the application forwards the REPORT to the Quoting Enclave for signing.

As schematically referenced by operation 2050, the Quoting Enclave retrieves its Report Key using the EGETKEY instruction and verifies the REPORT. The Quoting enclave creates the QUOTE structure and signs it with its EPID key. The Quoting Enclave returns the QUOTE structure to the application.

As schematically referenced by operation 2060, the application sends the QUOTE structure and any associated manifest of supporting data to the service challenger.

As schematically referenced by operation 2070, the challenger uses an EPID public key certificate and revocation information or an attestation verification service to validate the signature over the Quote. It then verifies the integrity of the manifest using USERDATA and checks the manifest for the response to the challenge it sent in operation 2010.

As noted herein above, when an enclave is instantiated, the hardware provides protections (confidentiality and integrity) to its data, when it is maintained within the boundary of the enclave. However, when the enclave process exits, the enclave will be destroyed and any data that is secured within the enclave will be lost. If the data is meant to be re-used later, the enclave should make special arrangements to store the data outside the enclave.

When invoking EGETKEY, the enclave selects criteria, or a policy, for which enclaves may access this sealing key. These policies are useful for controlling the accessibility of sensitive data to future versions of the enclave.

A processing system operating in accordance with one or more aspects of the present disclosure may support the following policies for Seal Keys: Sealing to the Enclave Identity and/or Sealing to the Sealing Identity.

Sealing to the Enclave's Identity produces a key that is available to any instance of this exact enclave. This does not allow future software to access the secrets of this enclave. Sealing to the enclave's Sealing Identity produces a key that is available to some other enclaves signed by the same Sealing Authority. This can be used to allow newer enclaves to access data stored by previous versions. Only a subsequent instantiation of an enclave, executing EGETKEY with the same policy specification, will be able to retrieve the Sealing Key and decrypt data that was sealed using that key by a previous instantiation.

When sealing to the enclave's Enclave Identity, EGETKEY bases the key on the value of the enclave's MRENCLAVE. Any change that impacts the enclave's measurement will yield a different key. This results in a different key for each enclave, providing full isolation between enclaves. A byproduct of using this policy is that different versions of the same enclave will also have different seal keys, preventing offline data migration. This policy is useful for usages where the old data should not be used after a vulnerability is found. For example, if the data is an authentication credential, the service provider may revoke those credentials and provision new ones. Access to the old credential might be harmful.

When sealing to the enclave's Sealing Identity, EGETKEY bases the key on the value of the enclave's MRSIGNER, and the enclave's version. MRSIGNER reflects the key/identity of the Sealing Authority that signed the enclave's certificate. The advantage of sealing to the Sealing Authority over sealing to the Enclave Identity is that it allows offline migration of sealed data between enclave versions. The Sealing Authority may sign multiple enclaves and enable them to retrieve the same seal key. These enclaves can transparently access data that was sealed by the other.

When sealing to a Sealing Authority, the older software should not be allowed to access data created by the newer software. This is true when the reason for releasing new software is to fix security issues. To facilitate this, the Sealing Authority has the option to prescribe a Security Version Number (SVN) as part of the Sealing Identity. EGETKEY allows the enclave to specify which SVN to use when producing the Seal Key. It will only allow the enclave to specify SVNs for its Sealing Identity or previous ones. When the enclave seals data, it has a choice to set the minimum SVN value of the enclave permitted to access that Sealing Key. This protects future secrets from access by old vulnerable software, but still enables a seamless upgrade transition where all previous secrets are available after the upgrade.

In certain implementations, a processing system operating with one or more aspects of the present disclosure may implement a trusted execution environment for protecting, at the micro-architectural level, the applications being executed by the processing system and the data being accessed by the applications. Such a processing system may comprise memory encryption engine (MEE) for encrypting the data lines which are moved from an on-package memory to a memory which is external with respect to the processor chip (such as the main system memory).

Figure 21:
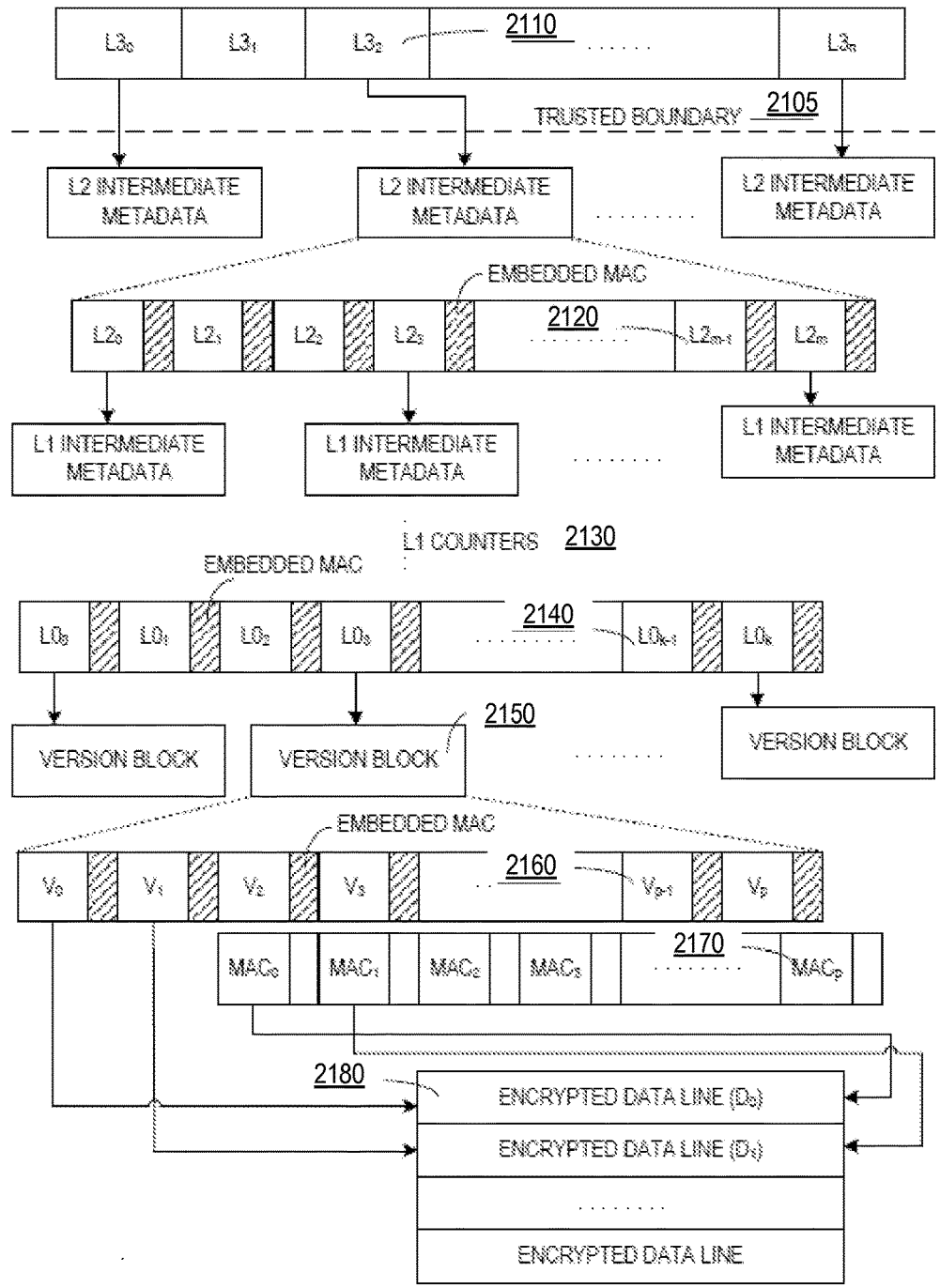
FIG. 21 illustrates a counter tree structure for integrity and replay protections implemented by an example processing system operating according to one embodiment.

FIG. 21 illustrates a counter tree structure for integrity and replay protections implemented by an example processing system operating in accordance with one or more aspects of the present disclosure. The counter tree structure includes a hierarchy of levels of tree nodes. The top (root) level includes a sequence of on-die counters (i.e., L3 counters 2110), which are stored in the internal storage of the processor die. The internal storage includes, but is not limited to, the on-die Static Random Access Memory (SRAM), register files, and any other suitable memory in the processor die. As the L3 counters 2110 are on the processor die, their contents are trusted and secure from passive and active attacks. However, the trusted boundary (shown as a dotted line 2105) ends at the L3 counters 2110. In certain implementations, the lower levels of the counter tree lie outside of the process die (e.g., in the main memory 1220 of FIG. 12).

In an illustrative example, each L3 counter 2110 is linked to a block of L2 intermediate metadata, which contains a sequence of L2 counters 2120. Each L2 counter 2120 is linked to a block of L1 intermediate metadata, which contains a sequence of L1 counters 2130. The blocks representing the L1 intermediate metadata and the L1 counters 2130 are omitted from FIG. 21 for simplicity of illustration. Each L1 counter 2130 is linked to a block of L0 intermediate metadata, which contains a sequence of L0 counters 2140. Each L0 counter 2140 is linked to a version block 2150, which contains a sequence of version nodes (represented by "V") 2160. Each version node 2160 is associated with an encrypted data line 2180 in the protected region of the main memory. The content of a version node 2160 is the version of the associated data line, which provides a temporal component of the encryption seed in the counter mode encryption. As the lower-level counters (including L2, L1 and L0 counters and the version nodes 260) are off the processor die and therefore are susceptible to attacks, each counter and each version node are encoded with an embedded Message Authentication Code (MAC) (shown as the blocks with hatched lines) to ensure their integrity.

In an illustrative example, each embedded MAC is computed over the line in which they are embedded, using a corresponding counter from the next higher level as input. In the example of FIG. 21, the embedded MAC for the version block 2150 associated with L03 (shown in FIG. 21 as the middle version block) is computed using the values of V0-Vp and its corresponding L0 counter (L03). The value of this embedded MAC is stored striped in the line of the version blocks 2150 (shown as striped boxes in FIG. 21). The embedded MAC for each line of L0, L1 and L2 is computed similarly. L3 counters do not need embedded MACs because the contents of L3 counters are within the trusted boundary 2105.

The entire counter tree built over the protected memory region, starting from the versions up to the L3 counters, provides replay protection to the data lines in the protected memory region. The process of replay protection is as follows. When a processor performs a read operation or a write operation to a data line, the MEE loads a branch of the counter tree that contain tree nodes (also referred to as branch nodes) identified by the address of the data line. The process of loading the tree nodes along a branch and verifying the authenticity of their values is herein referred to as a tree walk. Tree walks proceed from the bottom level of the counter tree (i.e., the version nodes 2160) to the root nodes (i.e., the L3 counters). The authenticity of the tree node values may be verified because a major portion of the tree structure is resident in the main memory and therefore is susceptible to attacks. In case of a write, the tree walk is performed to verify the authenticity of the branch nodes values and update those values. In case of a read, the tree walk is also performed to verify the authenticity of the branch nodes values but without updating those values. In certain implementations, the MEE 150 contains a finite state machine circuitry that implements the tree walk.

In an illustrative example, each encrypted data line 2180 is encoded with a MAC 2170 containing a MAC computed from the content of the data line 2180. Each time the data line is written back to memory, the MEE updates this MAC to reflect the most recent data value stored in memory. When a data line is read from memory, the MEE verifies the value of its associated MAC node 2170 to establish the integrity of the data line being read. The use of the MAC nodes 2170 provides integrity protection against modification attacks on a memory-resident data line.

When the processor executes a write operation to write back one of the encrypted data lines 2180 into the protected memory region (e.g., when evicting a data line from an on-die last level cache to the protected region in the main memory), the MEE identifies the version node 2160 and the L0, L1, L2 and L3 counters (2110-2140) associated with that data line. The MEE updates the MAC 2170 associated with the data line and increments the version of that data line in the identified version node 2160. In addition, the MEE also updates the identified L0, L1, L2 and L3 counters (2110-2140) of that data line, as well as the embedded MAC associated with the updated version and the counters. This update process proceeds from the bottom level of the counter tree up to the root level of L3 counters, which are stored securely on the chip on the processor die and hence are guaranteed protection against attacks. The counters at each level of the counter tree act as the versions for the next lower level ending with the version nodes 2160 storing the versions for the data lines. Hence, on a write to a data line, all of counters (including the version) and their associated embedded MACs along the branch identified by the data line's address are updated to reflect the version update.

In order to ensure replay protection, each time a data line is loaded from the protected region it is verified for authenticity against the tree nodes up to the root of the counter tree. A mismatch at any level indicates a potential attack and raises a security exception, thereby defeating the attack. Specifically, when a processor executes a read operation on one of the encrypted data lines 2180, the MEE identifies the version and the L0, L1, L2 and L3 counters (2110-2140) of that data line. Read operations do not alter the values of the version and the L0, L1, L2 and L3 counters (2110-2140). Upon a read operation, the MEE verifies the MAC 270 associated with the data line. In addition, the MEE 150 verifies the embedded MAC associated with each of the version, L0, L1, L2 and L3 counters (2110-2140). This verification process proceeds from the bottom level of the counter tree up to the secure root counter L3.

In certain implementations, the tree nodes loaded in a tree walk are cached locally in an MEE cache, which is a local cache of the MEE. The MEE cache stores the values of the tree nodes (including the version nodes and the embedded MACs) that have been verified by previous requests. The content of the MEE cache is secure because it is located on the processor die. For read operations, a tree walk is terminated when the first node along the branch of the tree walk is found in the MEE cache. For write operations, a tree walk is terminated when the first node along the branch of the tree walk is found in the MEE cache and that the cached tree node is in the modified state.

To ensure that the counter tree returns correct counter values for all requests, on a write request the MEE completes the update to all of the tree nodes along the write request's branch before any other request (read or write) sharing any of those tree nodes can proceed. As read requests do not alter the values of the counter tree, some of the read requests may be processed in parallel even though these read requests share one or more of the tree nodes in the counter tree.

In certain implementations, a processing system operating in accordance with one or more aspects of the present disclosure may support hardware-assisted virtualization.

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as virtual machine monitor (VMM), above the hardware and below the virtual machines. A VMM may run directly on the server hardware without an operating system beneath it or as an application running under a traditional operating system. A VMM may abstract the physical layer and present this abstraction to virtual machines to use, by providing interfaces between the underlying hardware and virtual devices of virtual machines.

CPU virtualization features enable faithful abstraction of the full prowess of Intel CPU to a virtual machine (VM). All software in the VM can run without any performance or compatibility hit, as if it was running natively on a dedicated CPU.

Memory virtualization features allow abstraction isolation, and monitoring of memory on a per VM basis. These features may also make live migration of VMs possible, add to fault tolerance, and enhance security. Example features include DMA remapping and Extended page tables (EPT), including their extensions: accessed and dirty bits and fast switching of EPT contexts.

I/O virtualization features facilitate offloading of multi-core packet processing to network adapters as well as direct assignment of virtual machines to virtual functions including disk I/O. Examples include: Virtual machine device queues (VMDq), Single Root IO Virtualization (SR-IOV, also a PCI SIG standard), and data direct I/O enhancements (DDIO), etc.

Certain processor architectures support virtualization by providing special instructions for facilitating virtual machine execution. In certain implementations, a processing system operating in accordance with one or more aspects of the present disclosure may support executing a VMM that acts as a host and has full control of the processor and other platform hardware. A VMM presents a virtual machine with an abstraction of one or more virtual processors. A VMM is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the VMM can retain control of platform resources. A transition from the reduced privilege level (also referred to as VMX non-root operation in certain processor architectures) to the VMM context is referred to as a VM exit and may be performed by invoking a special Instruction Set Architecture (ISA)-dependent instruction (e.g., VMCALL).

Processor support for virtualization is provided by a form of processor operation called VMX operation. There are two kinds of VMX operation: VMX root operation and VMX non-root operation. In general, a VMM will run in VMX root operation and guest software will run in VMX non-root operation. Transitions between VMX root operation and VMX non-root operation are called VMX transitions. There are two kinds of VMX transitions. Transitions into VMX non-root operation are called VM entries. Transitions from VMX non-root operation to VMX root operation are called VM exits.

What is claimed is:

1. A processor comprising:
a processor core; and
a memory controller coupled between the processor core and a memory, wherein the processor core is to perform the following in response to receiving a content read instruction from an application:
identify a cache line (CL) from a plurality of CLs of a cryptographic cache block (CCB) requested in the content read instruction;
load security metadata, wherein the security metadata comprises a first message authentication code (MAC), version (VER) data, and counter data;
retrieve, from the memory, the CCB;
retrieve, from the memory, a first physical address for a second CL of the plurality of CLs, a second physical address for a third CL of the plurality of CLs, and a MAC key;
concatenate the first physical address and the second physical address with the MAC key to generate a second MAC;
compare the first MAC with the second MAC;
decrypt the CCB using the security metadata when the first MAC matches the second MAC; and
send at least the identified CL from the decrypted CCB to the application.

2. The processor of claim 1, wherein the processor core is further to load the security metadata from a cryptographic tree.

3. The processor of claim 1, wherein the processor core is further to:
verify, using the first MAC, that encrypted data in the memory was not modified while resident in the memory; and
verify, using the counter data, that the VER data in the memory was not modified while resident in the memory.

4. The processor of claim 1, wherein the processor core is further to send a security exception to the application when the first MAC does not match the second MAC.

5. The processor of claim 1, wherein the processor core is further to:
generate a cryptographic pad using the plurality of CLs; and
combine the decrypted CCB with the cryptographic pad to generate ciphertext for content read instruction, wherein the CCB is loaded and the cryptographic pad are generated in parallel.

6. The processor of claim 1, wherein the processor core is to decrypt the CCB using a counter mode decryption, wherein the counter mode decryption comprises an encryption seed that is unique to each of the plurality of CLs.

7. The processor of claim 1, wherein the processor core is to send the entire CCB to the application.

8. A system comprising:
a memory device; and
a processor coupled to the memory device, the processor comprising a processor core and a memory controller coupled between the processor core and the memory, wherein the processor core is to perform the following in response to receiving a content write instruction from an application:

identify a cache line (CL) from a plurality of CLs of a cryptographic cache block (CCB) requested in the content read instruction;

load security metadata, wherein the security metadata comprises a first message authentication code (MAC), version (VER) data, and counter data;

retrieve, from the memory, the CCB;

retrieve, from the memory, a first physical address for a second CL of the plurality of CLs, a second physical address for a third CL of the plurality of CLs, and a MAC key;

concatenate the first physical address and the second physical address with the MAC key to generate a second MAC;

compare the first MAC with the second MAC;

decrypt the CCB using the security metadata when the first MAC matches the second MAC; and send at least the identified CL from the decrypted CCB to the application.

9. The system of claim 8, wherein the processor core is further to load the security metadata from a cryptographic tree.

10. The system of claim 8, wherein the processor core is further to:

verify, using the first MAC, that encrypted data in the memory was not modified while resident in the memory; and verify, using the counter data, that the VER data in the memory was not modified while resident in the memory.

11. The system of claim 8, wherein the processor core is further to:

retrieve, from the memory, the security metadata associated with the CCB;

increment a value of the VER data of the security metadata associated with the CCB to obtain an incremented value; and generate a cryptographic pad for the CCB using the incremented value.

12. The system of claim 8, wherein the processor core is to encrypt the CCB using a counter mode encryption, wherein the counter mode encryption comprises an encryption seed that is unique to each of the plurality of CLs.

13. The system of claim 12, wherein the encryption seed comprises a set of encryption parameters stored in a protected region of the memory, and wherein the set of encryption parameters comprise unique encryption keys and each increment of a counter associated with a different unique encryption key.

14. A non-transitory computer readable storage medium storing instructions that when executed by a processing device causes the processing device to:

receive a content read instruction from an application;

identify a cache line (CL) from a plurality of CLs of a cryptographic cache block (CCB) requested in the content read instruction;

load security metadata, wherein the security metadata comprises a first message authentication code (MAC), version (VER) data, and counter data;

retrieve, from a memory, the CCB;

retrieve, from the memory, a first physical address for a second CL of the plurality of CLs, a second physical address for a third CL of the plurality of CLs, and a MAC key;

concatenate the first physical address and the second physical address with the MAC key to generate a second MAC;

compare the first MAC with the second MAC;

decrypt the CCB using the security metadata when the first MAC matches the second MAC; and send at least the identified CL from the decrypted CCB to the application.

15. The non-transitory computer readable storage medium of claim 14, the processing device further to load the security metadata from a cryptographic tree.

16. The non-transitory computer readable storage medium of claim 14, the processing device further to:

verify, using the first MAC, that encrypted data in the memory was not modified while resident in the memory; and verify, using the counter data, that the VER data in the memory was not modified while resident in the memory.

17. The non-transitory computer readable storage medium of claim 14, the processing device further to send a security exception to the application when the first MAC does not match the second MAC.

18. The non-transitory computer readable storage medium of claim 14, the processing device further to:

determine when the identified CL is stored in the CL cache;

retrieve, from the CL cache, the identified CL in response to the identified CL being stored in the CL cache; and send, to the application, the identified CL, wherein the CL cache stores one or more prefetched CLs that are decrypted.

\* \* \* \* \*